US012627670B2

(12) United States Patent
Haque et al.

(10) Patent No.: US 12,627,670 B2
(45) Date of Patent: May 12, 2026

(54) BLOCKCHAIN FOLDING

(71) Applicant: Comcast Cable Communications, LLC, Philadelphia, PA (US)

(72) Inventors: Asad Haque, Chesterbrook, PA (US); Nancy Davoust, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 23 days.

(21) Appl. No.: 18/787,747

(22) Filed: Jul. 29, 2024

(65) Prior Publication Data

US 2024/0422163 A1     Dec. 19, 2024

Related U.S. Application Data

(63) Continuation of application No. 18/356,934, filed on Jul. 21, 2023, now Pat. No. 12,052,259, which is a
(Continued)

(51) Int. Cl.
*H04L 9/40* (2022.01)
*G06F 21/60* (2013.01)
(Continued)

(52) U.S. Cl.
CPC .......... *H04L 63/102* (2013.01); *G06F 21/604* (2013.01); *H04L 9/0637* (2013.01); *H04L 63/20* (2013.01); *H04L 9/50* (2022.05)

(58) Field of Classification Search
CPC ..... H04L 63/102; H04L 9/0637; H04L 63/20;

H04L 2209/38; H04L 63/0435; H04L 2209/805; H04L 9/3239; G06F 21/604; G06F 21/64; G06F 21/44; H04W 4/33; H04W 4/70
See application file for complete search history.

(56) References Cited

U.S. PATENT DOCUMENTS

| 10,671,515 B1 | 6/2020 | Sanghvi |
| 10,901,957 B2 | 1/2021 | Natarajan et al. |

(Continued)

FOREIGN PATENT DOCUMENTS

| DE | 112017006701 T5 | 9/2019 |
| WO | 2020/108742 A1 | 6/2020 |

OTHER PUBLICATIONS

Ouaddah, A., Abou Elkalam, A., and Ait Ouahman, A. (2016) FairAccess: a new Blockchain-based access control framework for the Internet of Things. Security Comm. Networks, 9: 5943-5964. (Year: 2016).*

(Continued)

*Primary Examiner* — Michael R Vaughan
(74) *Attorney, Agent, or Firm* — BakerHostetler

(57) ABSTRACT

An active distributed ledger may comprise an indication of an inactive permission associated with a user device. An entry comprising such indication added to another distributed ledger that is supplemental to the active distributed ledger. An updated active distributed ledger may be generated that does not comprise the indication of the inactive permission. The updated active distributed ledger may comprise an indication of a new permission associated with the user device. The updated active distributed ledger may be stored on the user device or any other device on a network.

28 Claims, 17 Drawing Sheets

Related U.S. Application Data continuation of application No. 16/395,003, filed on Apr. 25, 2019, now Pat. No. 11,729,175.

(51) Int. Cl.
H04L 9/00 (2022.01)
H04L 9/06 (2006.01)

(56) References Cited

U.S. PATENT DOCUMENTS

| | | | |
|---|---|---|---|
| 11,139,955 | B1 | 10/2021 | So et al. |
| 11,188,523 | B1 | 11/2021 | Harold |
| 2018/0060496 | A1 | 3/2018 | Bulleit et al. |
| 2018/0189333 | A1 | 7/2018 | Childress et al. |
| 2018/0323963 | A1 | 11/2018 | Stollman |
| 2019/0190697 | A1 | 6/2019 | Cunico et al. |
| 2019/0372834 | A1 | 12/2019 | Patil et al. |
| 2019/0386970 | A1 | 12/2019 | Signorini et al. |
| 2020/0125661 | A1 | 4/2020 | Albright et al. |
| 2020/0175156 | A1* | 6/2020 | Bhamidipati ...... G06Q 20/3678 |
| 2020/0204344 | A1 | 6/2020 | Sardesai et al. |
| 2020/0218795 | A1 | 7/2020 | Antar et al. |
| 2020/0218815 | A1 | 7/2020 | Haque et al. |
| 2020/0274697 | A1 | 8/2020 | Ragan |
| 2021/0224827 | A1 | 7/2021 | Goel et al. |
| 2022/0052988 | A1* | 2/2022 | Gadnis ............... H04L 63/0464 |

OTHER PUBLICATIONS

Amelchenko et al., "Blockchain Abbreviation: Implemented by Message Passing and Shared Memory (Extended abstract)" 2017 IEEE 16th International Symposium on Network Computing and Applications (NCA), 2017, pp. 1-7.

US Patent Application filed on Apr. 25, 2019, entitled "Blockchain Folding", U.S. Appl. No. 16/395,003.

US Patent Application filed on Jul. 21, 2023, entitled "Blockchain Folding", U.S. Appl. No. 18/356,934.

* cited by examiner

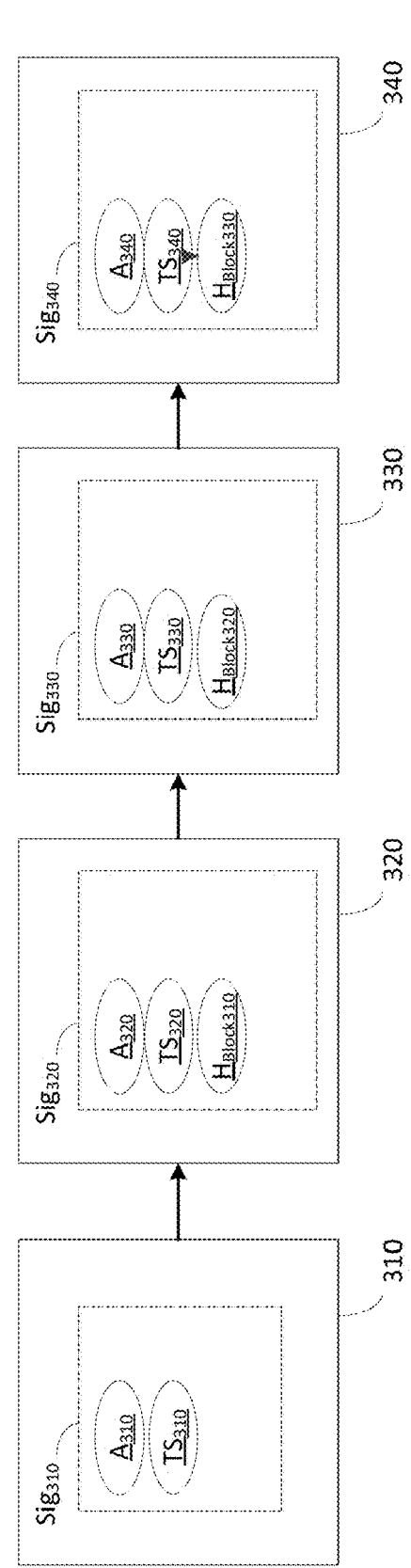
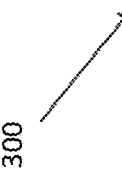
FIG. 3

Create a public key
and a private key
for a computing
device
410

Create a distributed
database entry
420

Add the distributed
database entry to a
distributed ledger
430

Create a public key
and a private key
for a device
440

Create a second
distributed database
entry
450

Add the second
distributed database
entry to the
distributed database
460

FIG. 8

"header": {
    "block": 4,
    "merkleRootHash": "SNwkdAkSTvwsuPEvGo2ikaNqGtOiz2vebwOkB3S3IAc=",
    "nonce": "ej2ekR9ZMCqd63bC",
    "previousBlockHash": "zxkrt1LwL3XpWrAHHxbQmj4v6ioBzDEUDGrYKwG6uunk=",
    "timestamp": 15227962225013,
    "version": 1
},
"input": {

"publicKey": " ......zezsJ1QlMk7IPBJBTQqKA............",
    "signature": " .......GmxJAAiBpoBSX7IC44f........."

},
"inputNode": "1Enga4PNwQfrPdVCJqAMP4jhiTcXqhxiio",
"notBefore": 0,
"outputNode": "1DB7nrhWouhKqXgsSUuHBaQz25h1r1nSPy",
"targetNode": "1CRSfDoT6ytLv35LrR281AonjBaqfDAKWh",
"txnId": "u9YWdlDKvXYaBVS5k",
"action": "allow",
    "exp": 0

}

800

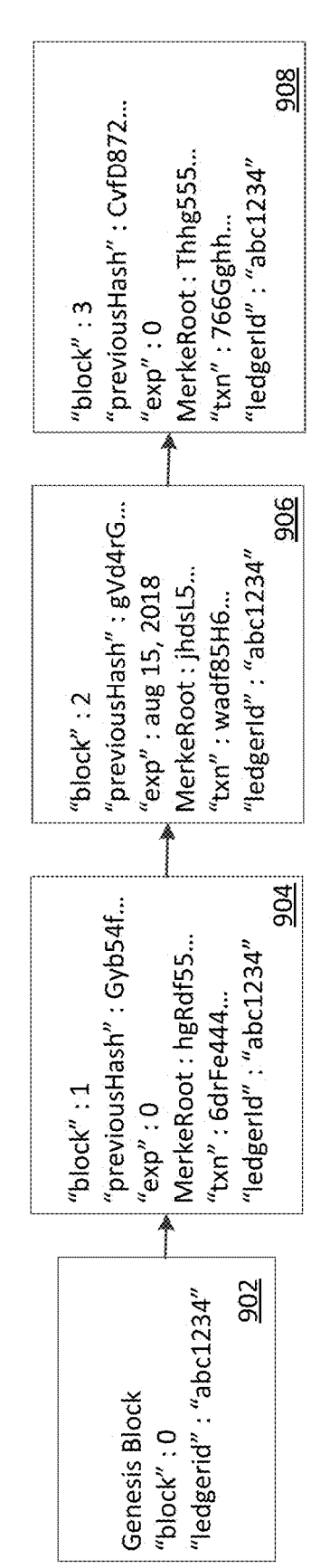
900
Genesis Block
"block" : 0
"ledgerId" : "abc1234"
902
"block" : 1
"previousHash" : Gyb54f...
"exp" : 0
MerkeRoot : hgRdf55...
"txn" : 6drFe444...
"ledgerId" : "abc1234"
904
"block" : 2
"previousHash" : gVd4rG...
"exp" : aug 15, 2018
MerkeRoot : jhdsL5...
"txn" : wadf85H6...
"ledgerId" : "abc1234"
906
"block" : 3
"previousHash" : CvfD872...
"exp" : 0
MerkeRoot : Thhg555...
"txn" : 766Gghh...
"ledgerId" : "abc1234"
908
FIG. 9

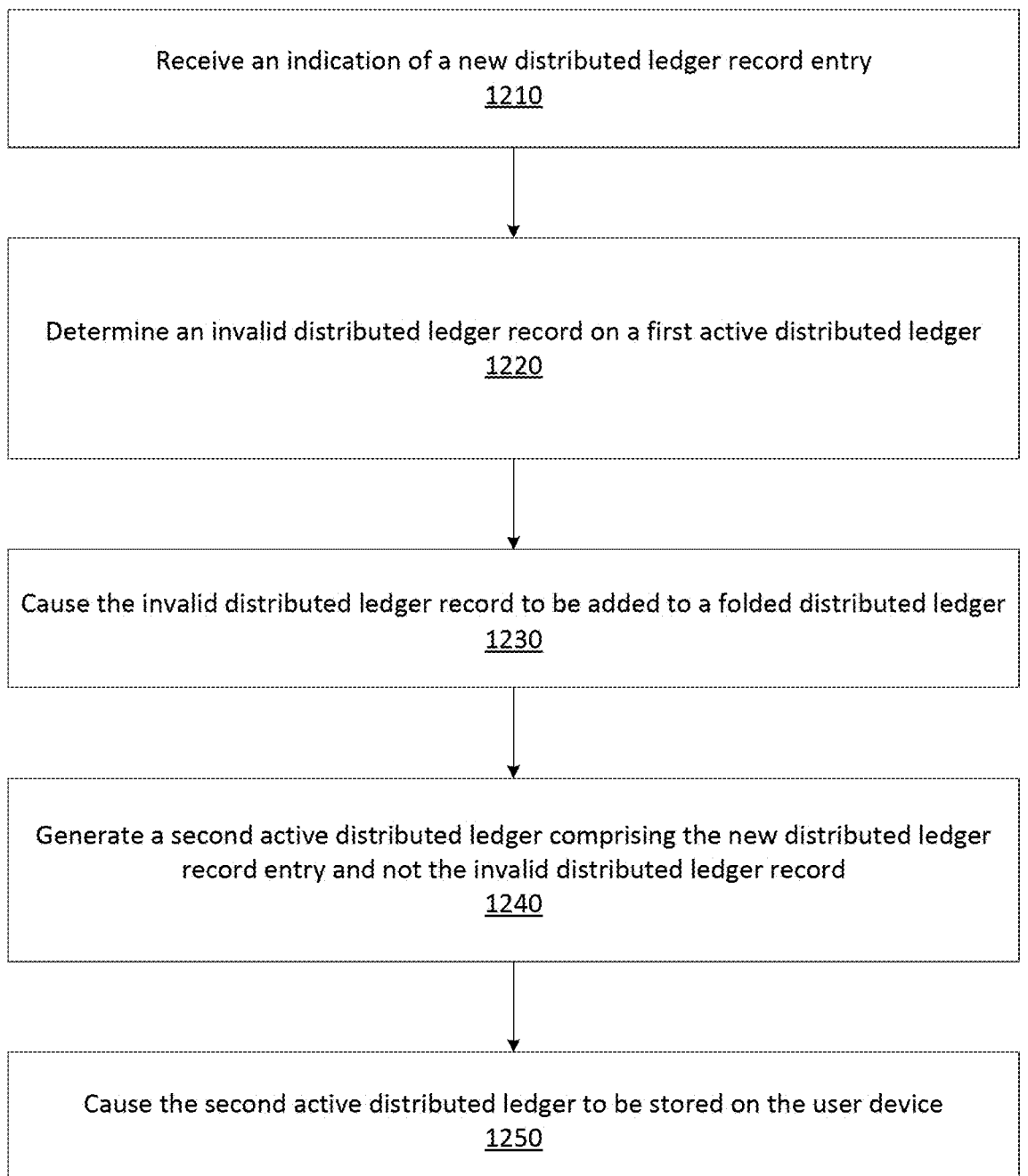

Receive an indication of a new distributed ledger record entry
1210

Determine an invalid distributed ledger record on a first active distributed ledger
1220

Cause the invalid distributed ledger record to be added to a folded distributed ledger
1230

Generate a second active distributed ledger comprising the new distributed ledger record entry and not the invalid distributed ledger record
1240

Cause the second active distributed ledger to be stored on the user device
1250

FIG. 12

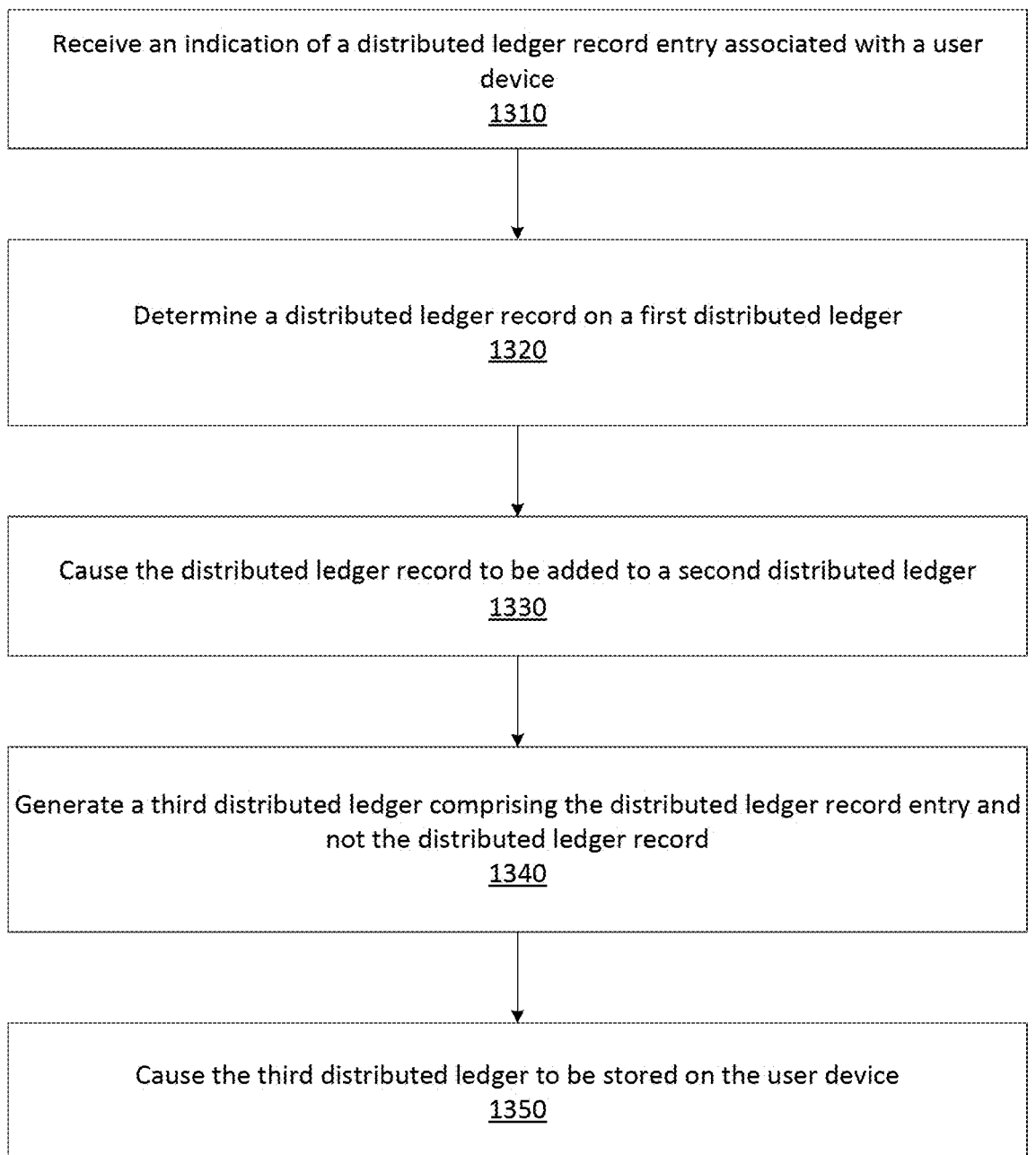

Receive an indication of a distributed ledger record entry associated with a user device
1310

Determine a distributed ledger record on a first distributed ledger
1320

Cause the distributed ledger record to be added to a second distributed ledger
1330

Generate a third distributed ledger comprising the distributed ledger record entry and not the distributed ledger record
1340

Cause the third distributed ledger to be stored on the user device
1350

FIG. 13

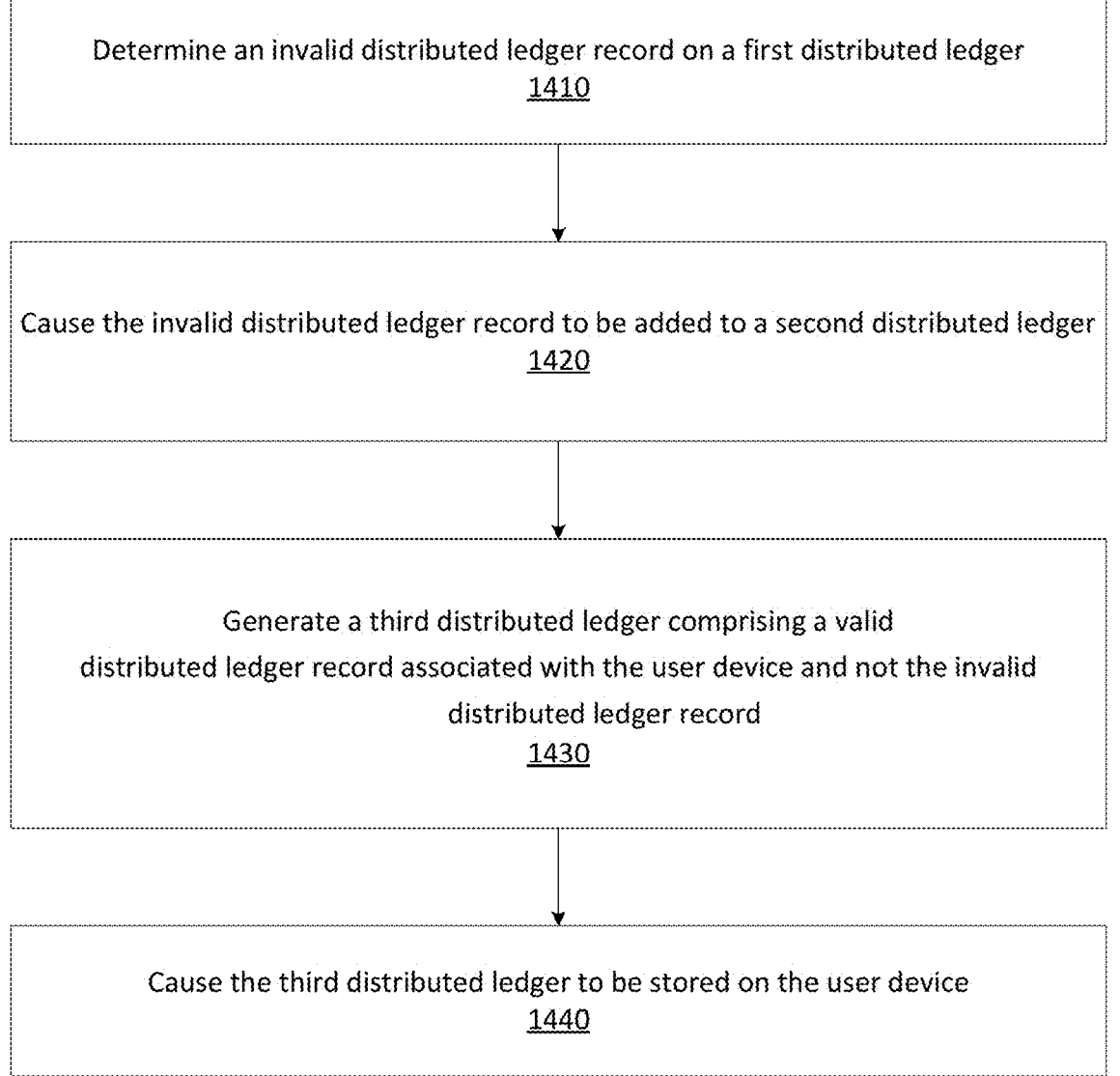

Determine an invalid distributed ledger record on a first distributed ledger
1410

Cause the invalid distributed ledger record to be added to a second distributed ledger
1420

Generate a third distributed ledger comprising a valid
distributed ledger record associated with the user device and not the invalid
distributed ledger record
1430

Cause the third distributed ledger to be stored on the user device
1440

FIG. 14

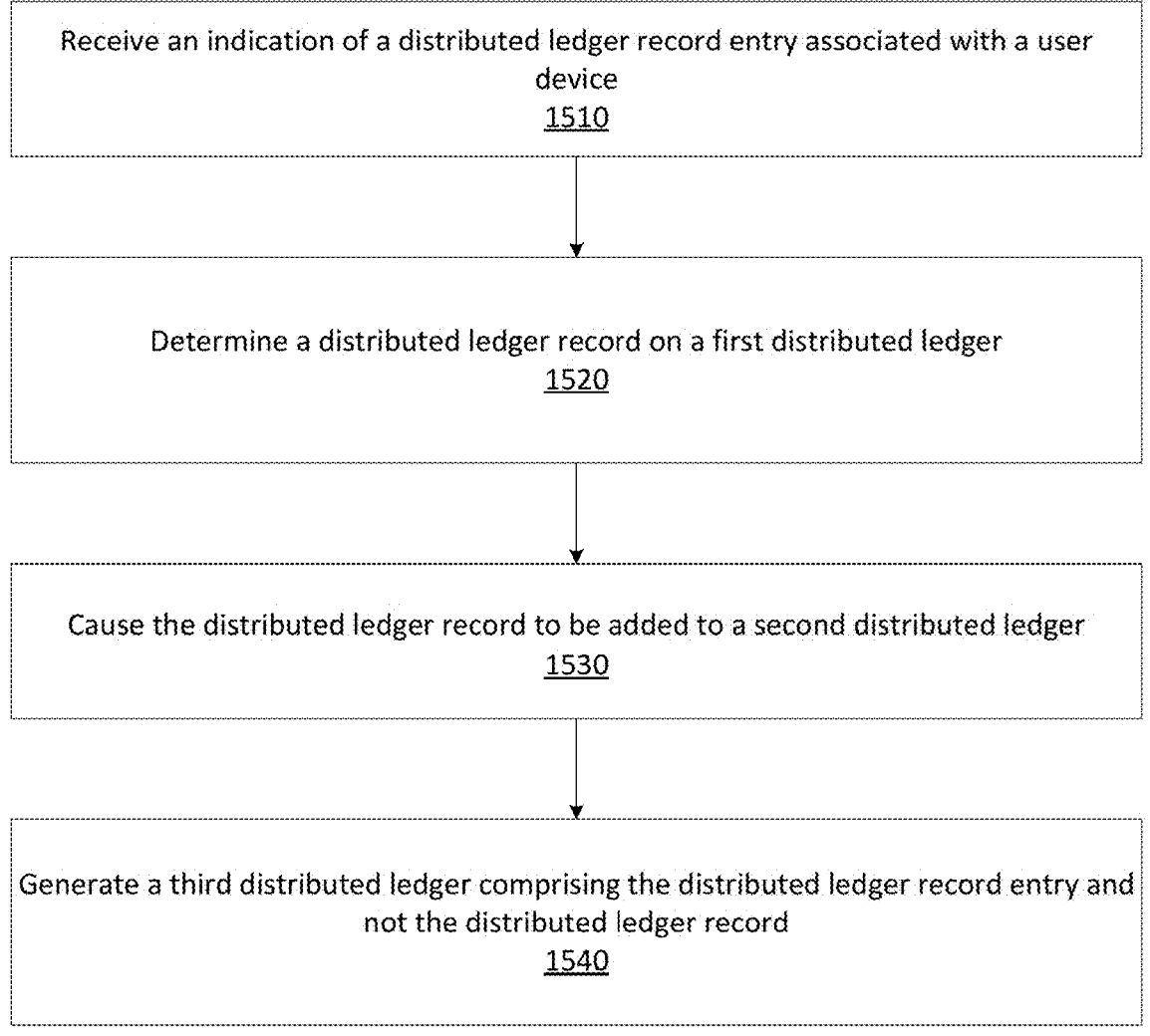

Receive an indication of a distributed ledger record entry associated with a user device
1510

Determine a distributed ledger record on a first distributed ledger
1520

Cause the distributed ledger record to be added to a second distributed ledger
1530

Generate a third distributed ledger comprising the distributed ledger record entry and not the distributed ledger record
1540

FIG. 15

Receive an indication of the third distributed ledger
1610

Grant access to the user device based on the third distributed ledger
1620

BLOCKCHAIN FOLDING

CROSS-REFERENCE TO RELATED APPLICATIONS

This application is a continuation of U.S. patent application Ser. No. 18/356,934, filed Jul. 21, 2023, now U.S. Pat. No. 12,052,259, issued Jul. 30, 2024, which is a continuation of U.S. patent application Ser. No. 16/395,003, filed Apr. 25, 2019, now U.S. Pat. No. 11,729,175, issued Aug. 15, 2023, which are hereby incorporated by reference in their entirety.

BACKGROUND

Distributed ledgers may be implemented for use with various technologies. For example, distributed ledgers may have applications to Internet of Things (IoT) devices. IoT devices may be constrained by storage and/or processing capabilities. Developers for distributed ledgers may face issues, such as issues with size and/or growth of the distributed ledger, cost associated with storage of the distributed ledger, increased network transmission time, increased central processing unit (cpu) time for validation of the distributed ledger, as examples.

SUMMARY

Indications of permissions associated with a user device may be stored on distributed ledgers. The distributed ledgers may comprise a primary distributed ledger stored on the user device. The primary distributed ledger may comprise records indicating active permissions. The distributed ledgers may comprise a secondary distributed ledger stored external to the user device, such as on a network computing system. The secondary distributed ledger may comprise entries indicating inactive permissions, such as expired, invalid, and/or revoked permissions. Based on determining that a permission recorded on the primary distributed ledger is no longer active, an indication of the inactive permission may be recorded on the secondary distributed ledger. An updated primary distributed ledger may be generated that does not comprise the inactive permission. The updated primary distributed ledger may be stored to the user device. Storing and/or processing the updated primary distributed ledger, rather than a distributed ledger comprising entries indicating both active and inactive permissions, may result in reduced consumption of and/or requirement for storage and/or computing resources.

BRIEF DESCRIPTION OF THE DRAWINGS

The following drawings show generally, by way of example, but not by way of limitation, various examples discussed in the present disclosure. In the drawings:

FIG. 3 shows an example distributed ledger architecture.
FIG. 8 shows an example block of a blockchain.
FIG. 9 shows an example blockchain.

FIG. 12 shows an example method.
FIG. 13 shows an example method.
FIG. 14 shows an example method.
FIG. 15 shows example method.

DETAILED DESCRIPTION

Figure 1:
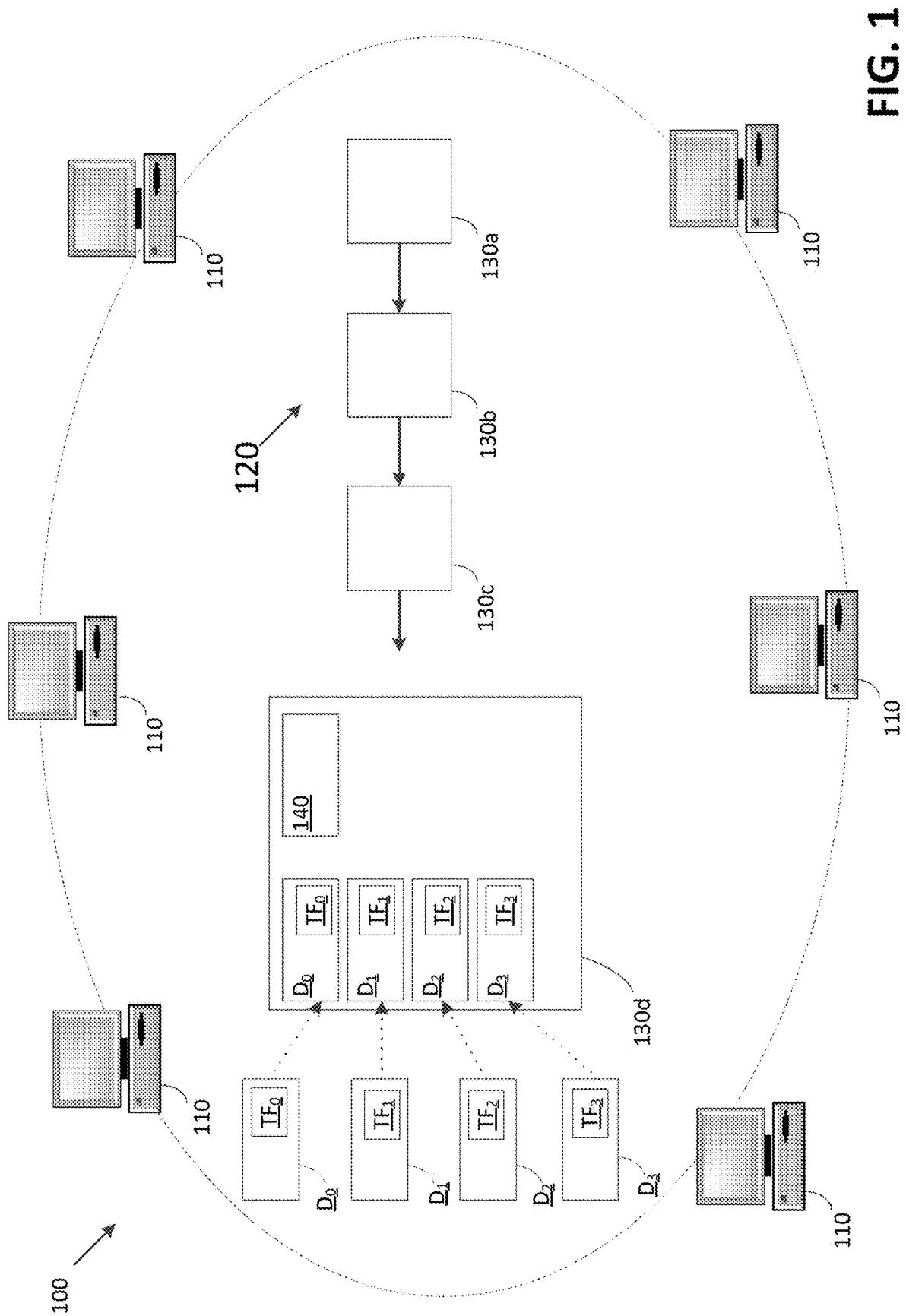
FIG. 1 shows an example distributed system architecture.

A distributed ledger (e.g., blockchain) may comprise blocks. The blocks may indicate device associations. For example, the blocks may indicate devices associated with a common entity. The common entity may comprise a common user, a common group of users, a common account, and/or a common premises, as examples. The distributed ledger may be split, such as into an active branch (e.g., primary branch) branch and a secondary branch (e.g., folded branch). The active branch may comprise blocks comprising live (e.g., active, valuable, valid, etc.) transactions. The secondary branch may comprise blocks comprising inactive (e.g., not valuable, invalid, expired, no longer useful or needed, etc.) transactions. Blocks comprising inactive transactions may be removed from the active branch. The blocks comprising inactive transactions may be added to the secondary branch.

Blocks in the secondary branch may comprise a new block number. The new block number may indicate a position in the secondary branch. The blocks in the secondary branch may comprise an original block number. The blocks in the secondary branch may comprise a reference to the original block number.

Blocks in the active branch may comprise a new block number. The new block number may indicate a position in the active branch. The blocks in the active branch may comprise an original block number. The blocks in the active branch may comprise a reference to the original block number. The original distributed ledger may be reconstituted by merging the active branch and the secondary branch using original block numbers. The secondary branch may be stored in a network computing environment, such as a cloud computing environment. The active branch may be transmitted to one or more user devices. The one or more user devices may use the received active branch to determine permissions associated with at least one of the one or more user devices.

A user device may store a copy of a distributed ledger. The user device may comprise a mobile device, a laptop computer, a desktop computer, and/or an IoT device, as examples. An IoT device may comprise a device embedded with electronics, such as a circuitry part, a sensor, a camera, an audio input or output, or a lighting unit. An IoT device have (e.g., or may be configured with) computing capabilities. An IoT device may have (e.g., or may be configured with) network connectivity capabilities. An IoT device may have capabilities (e.g., or may be configured) to collect and exchange data. For example, an IoT device may comprise at least one of a personal computer, a mobile phone, a household appliance, a wearable, a gateway device, a health appliance, a premises management system component, a content device, a display, and a vehicle.

The stored copy of the distributed ledger may comprise indications of access permissions to the user device. As more permissions are added, the distributed ledger may grow and may reach a size too large for the memory of the device. Rather than storing all permissions to the user device, inactive permissions may be stored external to the user device. The inactive permissions may be stored on a secondary branch. The secondary branch may be stored on a network computing system, such as a cloud computing system. Active permissions may be stored on an active branch. The active branch may be stored on the user device.

A secondary distributed ledger (e.g., secondary distributed ledger, inactive distributed ledger, etc.) may serve to maintain the integrity of an original record. An original (combined active and secondary) distributed ledger may not be stored. The original distributed ledger may be generated (e.g., merged, recreated, reconstituted, etc.) using information from the active distributed ledger and the secondary distributed ledger.

Mining of the distributed ledgers may be done in a network computing environment, such as a cloud computing environment. The network computing environment may comprise specialized miner devices. A miner may receive a new transaction for the user device. The miner may examine an active distributed ledger associated with the user device. The miner may determine what transactions stored to the active distributed ledger should be secondary. The miner may determine what transactions stored to the active distributed ledger should be secondary based on folding criteria. Folding criteria may comprise, but are not limited to, expiration of a transaction, revocation of a transaction, type of a device, compromise (e.g., of a device, of a key), etc. Any other appropriate folding criteria may be used.

The miner may add the transactions identified for folding to the secondary distributed ledger. The blocks on the secondary distributed ledger may comprise an indication of an original position of the transaction, so that an original ledger (comprising secondary and active transactions) may be recreated. Recreating the original ledger may comprise recalculating hashes. The hashes may be recalculated based on original positions.

The miner may add a new block to the active distributed ledger that comprises the new transaction. The new block may comprise a hash. The hash may be calculated using only transactions that have not been identified for folding. As transactions are transferred from the active distributed ledger to the secondary distributed ledger, the secondary distributed ledger may grow, and the active distributed ledger may shrink or stay the same size.

Reducing records the user device may need to examine may reduce processing time associated with management of the access permissions. Reducing the records the user device may need to examiner may reduce a computational resource expenditure associated with management of the access permissions.

FIG. 1 shows an example distributed system. The distributed system may comprise a network 100 of nodes 110. A node 110 may comprise a computing device, a central processing unit, a graphical processing unit, a field programmable gate array, and/or an application specific integrated circuit. The node 110 may comprise a cable modem, set-top box, lap top, smart phone, tablet, a portable digital assistant, a smart television, wearable computing device, mobile computing device, an Internet of Things ("IoT") device, and/or any device with computing capabilities or network connectivity capabilities. The node 110 may comprise a network computing device. The network computing device may comprise a cloud computing device.

The network 100 of nodes 110 may comprise a decentralized database. The decentralized database may not have a central administrator or centralized storage. Each node 110 in the network 100 may store a copy of a collection of data, such as a distributed ledger. A distributed ledger may comprise recorded entries, such as transactions. The data may be replicated, shared, or synchronized across the nodes 110. The decentralized database may be continually reconciled, such as to reflect changes to the collection of data. The nodes 110 may continually or periodically download the most recent version of the collection of data. The node 110 may automatically download the collection of data. The node 110 may automatically download the collection of data based on a node 110 joining the network 100. The collection of data may be received in other manners and based on other triggers or events.

A decentralized database, such as a distributed ledger, may comprise a blockchain 120. The decentralized database, such as the distributed ledger, may comprise a blockchain database and/or utilize blockchain data management techniques. A blockchain 120 may comprise one or more blocks 130 in which data is recorded. The blocks 130 in the blockchain 120 may function as a mechanism to organize the data in the blockchain 120. The blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may perform several operations to build the blockchain 120. The new data $D_0$, $D_1$, $D_2$, $D_3$ may be validated. One or more of the nodes 110 may validate the new data $D_0$, $D_1$, $D_2$, $D_3$. Based on the network 100 receiving the new data $D_0$, $D_1$, $D_2$, $D_3$, the nodes 110 may validate the new data $D_0$, $D_1$, $D_2$, $D_3$. If the new data $D_0$, $D_1$, $D_2$, $D_3$ comprises transactions, the nodes 110 may validate, verify, or authenticate the identity of the parties to the transaction. The transactions may be similar to the transactions in FIG. 8. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature with the public key. The digital signature may allow for verification of the transaction while maintaining the anonymity of the parties to the transaction.

The nodes 110 may collate the new data $D_0$, $D_1$, $D_2$, $D_3$ into a new block 130d. The nodes 110 may record one data $D_0$ in a new block 130d. The nodes 110 may perform an operation to add the new block 130d to the blockchain 120. If the data in the blocks 130 is related chronologically, such as where the first block 130a in the chain records older data than the data of subsequent blocks 130b, 130c, the nodes 110 may perform a timestamp function to log the sequence in which blocks 130 are added to the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

The nodes 110 may be incentivized to perform the operation to add a new block 130d to the blockchain 120. A block 130d may be assigned a value 140, such as a coin or unit of digital currency that may be transferred to one or more nodes 110 that perform part or all of the operation. A digital currency may comprise a cryptocurrency, such as Bitcoin, Litecoin, TorCoin, Ethereum, etc. The value 140 may depend on the difficulty of performing the operation for the block 130*d*. Also, if the data $D_0$, $D_1$, $D_2$, $D_3$ recorded in a block 130*d* comprises transactions, a transaction may assign a transaction fee $TF_0$, $TF_1$, $TF_2$, $TF_3$ which may be transferred to one or more nodes 110 that perform the operation on the block 130*d* in which the transaction is recorded. If an incentive is provided for nodes 110 to perform the operation to add the new block 130*d* to the blockchain 120, performance of the operation may be referred to as mining.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. Incentives may be divided proportionally to contribution of the nodes 110 to the work.

Once the operation is performed to add a new block 130*d* to the blockchain 120, the nodes 110 may communicate the new block 130*d* to the network 100. The nodes 110 may express their acceptance of the new block 130*d* to the blockchain 120 by working off the block 130*d* to perform the operation to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. A blockchain 120 may be assigned a score. The score may be assigned based on the computational work required to generate the blockchain 120. A node 110 may communicate the longest blockchain 120 that the node 110 has observed to the network 100, such as with a gossip protocol.

A device at a premises may comprise a node 110. A miner in a network computing environment may comprise a node 110. The device at the premises may transmit a transaction, such as an access permission, to the miner in the network computing environment. The miner in the network computing environment may generate a block comprising the transaction. The miner in the network computing environment may split the blockchain 120 into a secondary branch and an active branch. The miner in the network computing environment may add the block with the transaction to the active branch. The secondary branch may comprise blocks comprising transactions that are not relevant to the device at the premises. The active branch may comprise blocks comprising transactions that are relevant to the device at the premises. The miner in the network computing environment may store the secondary branch in the network computing environment. The miner in the network computing environment may return the active branch to the device at the premises. The device at the premises may store the active branch locally. The device at the premises may use the active branch to determine access permissions. The miner in the network computing environment may maintain the blockchain 120 (e.g., add blocks to the blockchain, split blocks into the secondary branch and active branch, etc.) using a consensus algorithm, such as proof-of-work, proof of stake, or proof of identity of the miner, as examples. The miner may generate a hash, such as by combining a nonce with data. The hash may be validated based on a condition. For example, the condition may comprise a number of leading zeros.

The network 100 may have self-correcting mechanisms, such as to address discrepancies between nodes 110 in the network 100. If there is a fork in a blockchain 120, a node 110 working off one branch of the blockchain 120 may switch to a second branch of the blockchain 120, if the second branch becomes longer than the first branch. If a node 110 does not receive a block 130*b*, the node 110 may request the block 130*b*. The node 110 may request the block 130*b* based on receiving the next block 130*c* and determines that the node 110 did not receive the previous block 130*b*.

One or more nodes 110 in the network 100 may not participate in building the blockchain 120. The operations that the nodes 110 in the network 100 may perform relating to the blockchain may not be limited to building the blockchain 120. One or more nodes 110 may monitor the blockchain 120 for particular transactions. The nodes 110 may monitor the blockchain 120 for transactions that comprise an identifier associated with a party.

Figure 2:
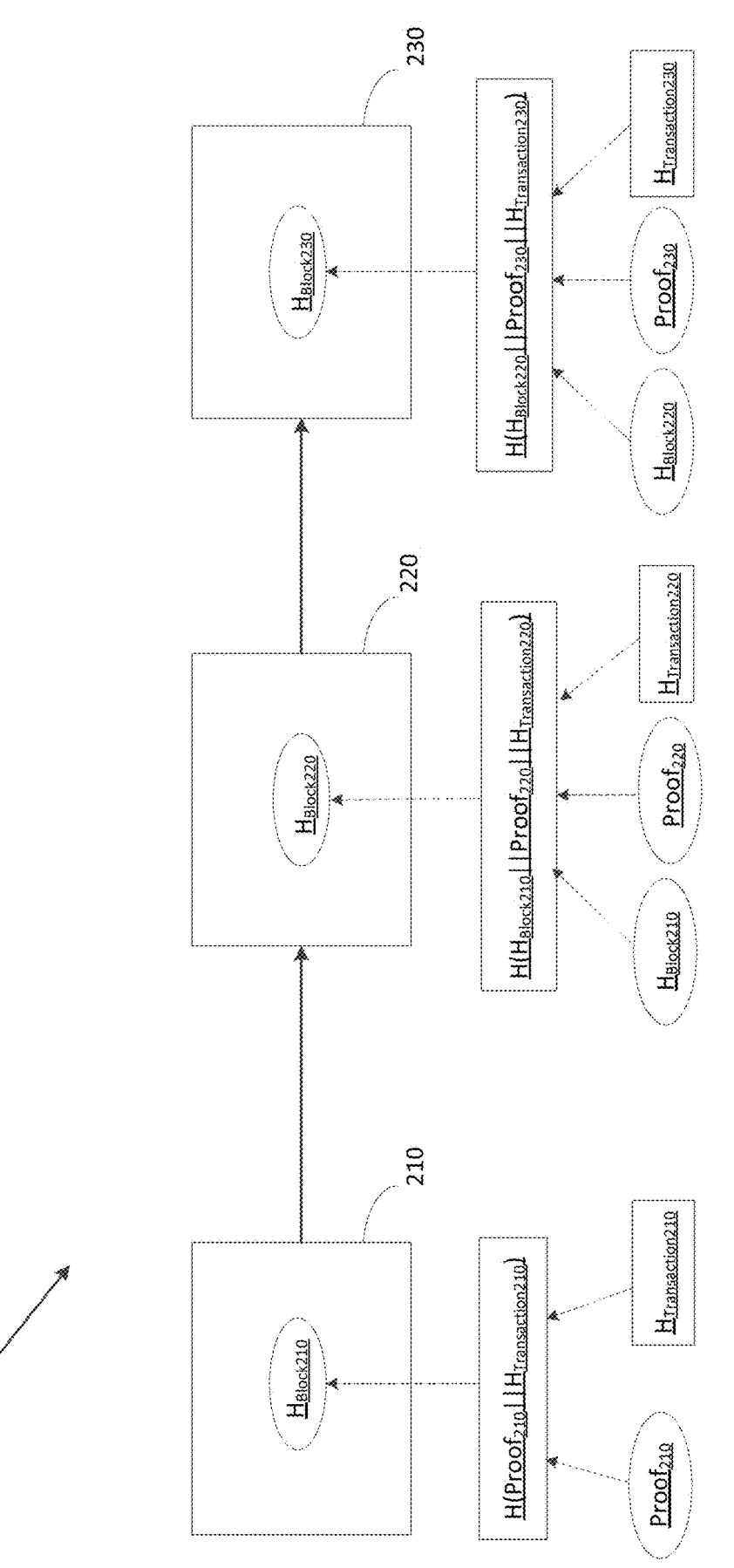
FIG. 2 shows an example blockchain architecture.

FIG. 2 shows an example distributed ledger architecture. A distributed ledger may comprise a blockchain 200 in which one or more transactions are recorded in blocks 210, 220, 230. The transactions may be similar to the transactions in FIG. 8. The distributed ledger may comprise a blockchain database and/or utilize blockchain data management techniques. The blocks 210, 220, 230 may be linked in a sequence that represents the chronology of the execution, validation, or recording of the transactions. The blockchain 200 may comprise a genesis block 210 that records the earliest transaction in the blockchain 200 and comprises the first block 210 in the blockchain 200.

Each block 220, 230 following the genesis block 210 may record a transaction that was executed or validated subsequent to the transaction of the preceding block 210, 220, 230 in the blockchain 200. Each block 210, 220, 230 may record a transaction that occurred prior to the transaction of the subsequent block in the blockchain 200. For example, the block 230 may record a transaction that occurred after the transaction recorded in the block 220. A new transaction may be recorded in a new block. The new block may be appended to the last block 230 in the blockchain 200. Although the example blockchain 200 is depicted as comprising three blocks 210, 220, 230, the blockchain 200 may comprise less than three blocks or more than three blocks. The blocks 210, 220, 230 may record transactions as hashes of the transactions.

The blocks 210, 220, 230 may function as a mechanism to implement a timestamp server to generate computational proof of the chronological order of the transactions in the blockchain 200. A timestamp of a block 210, 220, 230 may comprise a hash of the transaction in the block 210, 220, 230 and the transaction of the previous block 210, 220, 230 in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that cryptographically hashed with the hash of the transaction of a block ($H_{Transaction}$) and the hash of the transaction of the previous block yields a hash ($H_{Block}$) with a pre-determined number of leading zero bits. A proof ($Proof_{210}$, $Proof_{220}$, $Proof_{230}$) may be identified such that the hash ($H_{Block}$) has 60 leading bits that are zero.

A proof-of-work for the block 220 may comprise scanning for a proof ($\text{Proof}_{220}$) that hashed with the transaction of the block 220 ($H_{Transaction220}$) and the hash of the previous block 210 ($H_{Block210}$) yields an output ($H_{Block220}$) that has a pre-determined number of leading zero bits. The proof-of-work may be solved for a hash function in which a hash of the transaction ($H_{Transaction}$) is an input of the hash function. The next block 230 in the blockchain 200 may be appended to the blockchain 200. The next block 230 may be appended based on performing a proof-of-work to identify a proof ($\text{Proof}_{230}$) which hashed with the transaction of the block 230 (or hash of the transaction $H_{Transaction230}$) and the hash of the block 220 ($H_{Block220}$) yields an output ($H_{Block230}$) with a pre-determined number of leading zero bits. Once the proof ($\text{Proof}_{230}$) is identified, the block 230 may be broadcast through the network. If the block 230 is accepted, the nodes may work on generating the next block in the blockchain 200 using the hash ($H_{Block230}$) of the accepted block 230.

An iterative proof-of-work protocol may deter modification of a block in the blockchain 200 as it would require re-doing the proof-of-work for each proceeding block in the blockchain 200. Modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the blockchain 200 may require a new proof-of-work.

A device at a premises may transmit a transaction, such as an access permission, to a miner in a network computing environment. The miner in the network computing environment may generate a block comprising the transaction. The miner in the network computing environment may maintain a secondary distributed ledger and an active distributed ledger. The secondary distributed ledger may be referred to as a folded distributed ledger. The secondary branch may comprise blocks comprising transactions that are not relevant to the device at the premises. The active branch may comprise blocks comprising transactions that are relevant to the device at the premises. The miner in the network computing environment may add the block with the transaction to the active distributed ledger. The miner in the network computing environment may store the secondary distributed ledger. The miner in the network computing environment may return the active distributed ledger to the device at the premises. The device at the premises may store the active distributed ledger locally. The device at the premises may use the active branch to determine access permissions. The secondary distributed ledger may comprise a blockchain, such as the blockchain 200. The active distributed ledger may comprise a blockchain, such as the blockchain 200. The miner in the network computing environment may maintain the secondary distributed ledger and the active distributed ledger without using proof-of-work.

FIG. 3 shows an example system for managing device association. The system may comprise a distributed ledger 300. The distributed ledger may comprise a blockchain. The distributed ledger 300 may comprise a register of devices. The distributed ledger 300 may comprise a register of associated devices. Associated devices may comprise devices associated with a common entity such as a user, a household, or a service provider. The devices may comprise computing devices, electronic devices, mobile devices, or Internet of Things (IoT) devices. A user device may comprise a device embedded with electronics, such as a circuitry part, a sensor, a camera, an audio input or output, or a lighting unit. An IoT device may have computing capabilities. A user device may have network connectivity capabilities. A user device may have capabilities (e.g., or may be configured) to collect and exchange data. A user device may comprise a personal computer, a mobile phone, a household appliance, a wearable, a gateway device, a health appliance, a premises management system component, a content device, a display, and a vehicle.

The distributed ledger 300 may be associated with an entity, such as a user, a household, or a service provider. The uniqueness of the distributed ledger 300 to the entity may disincentivize targeting of the distributed ledger 300, such as for tampering or breaching. Comprising device data associated with the entity, the distributed ledger 300 may not comprise a honeypot of data for an unauthorized user to access. A party attempting to tamper with a database to acquire private data, such as credit card information, may at best only obtain the credit card information of the entity from the distributed ledger 300.

The distributed ledger 300 may be anonymous. The distributed ledger 300 may not comprise data identifying the associated entity. The distributed ledger 300 may not comprise unsecured data identifying the associated entity. The distributed ledger 300 may comprise data identifying the associated entity in a secure or encrypted form. The data identifying the associated entity in the secure form may be opaque to users or devices examining the distributed ledger 300. The distributed ledger 300 may not require a user to divulge ownership information, such as to a central authority or backend authentication system. The distributed ledger 300 may achieve security through obscurity. The anonymity of the distributed ledger 300 may deter unauthorized tampering with the distributed ledger 300. A party wishing to access a device or data of the entity may not be able to identify the distributed ledger 300 as being associated with the entity.

The distributed ledger 300 may comprise as a mechanism for a device to vet the identity of another device. Vetting the identity of the device may comprise validating, verifying, or authenticating the identity of the device. The device may use the distributed ledger 300 to confirm association with the device. The device may access the distributed ledger 300 to determine whether to respond to a communication from the device. The device may access the distributed ledger 300 to determine whether to grant the device access to the device or to a proxied device.

The distributed ledger 300 may comprise a plurality of blocks 310, 320, 330, 340. Each block 310, 320, 330, 340 may comprise a distributed ledger entry. The distributed ledger entry may comprise data associated with a device, such as data identifying the device. Each block 310, 320, 330, 340 may comprise a hash of a key ($H_{PubKey310}$, $H_{PubKey320}$, $H_{PubKey330}$, $H_{PubKey340}$) of the device. The key may comprise a public key of the device. The public key may be unique to the device. The public key may be paired with a private key of the device. Each block 310, 320, 330, 340 may comprise an address of the device ($A_{310}$, $A_{320}$, $A_{330}$, $A_{340}$). The address may comprise a hash of the key ($H_{PubKey310}$, $H_{PubKey320}$, $H_{PubKey330}$, $H_{PubKey340}$) of the device, such as the public key of the device.

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate when the block 310, 320, 330, 340 was generated. The inclusion of the timestamps ($TS_{310}$, $TS_{320}$, $TS_{330}$, $TS_{340}$) may link the blocks 310, 320, 330, 340. Each block generated after a genesis block 320, 330, 340 may comprise a hash of the previous block ($H_{Block310}$, $H_{Block320}$, $H_{Block330}$) in the distributed ledger 300. The inclusion of the hash of the previous block ($H_{Block310}$, $H_{Block320}$, $H_{Block330}$) in the distributed ledger 300 may link the blocks 310, 320, 330, 340. The inclusion of the hash of the previous blocks ($H_{Block310}$, $H_{Block320}$, $H_{Block330}$) in the distributed ledger 300 may comprise an iterative chain of hash functions. The linking of the blocks 310, 320, 330, 340 may deter unauthorized tampering or breaching of the distributed ledger 300. Tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of the device, such as the private key of the device. The signature ($Sig_{310}$, $Sig_{320}$, $Sig_{330}$, $Sig_{340}$) may comprise an encryption of one or more of the address of the device ($A_{310}$, $A_{320}$, $A_{330}$, $A_{340}$), the hash of the key ($H_{PubKey310}$, $H_{PubKey320}$, $H_{PubKey330}$, $H_{PubKey340}$), the timestamp ($TS_{310}$, $TS_{320}$, $TS_{330}$, $TS_{340}$) and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed ledger 300. The private key used to sign may be necessary to generate or retroactively modify a block or entry of the distributed ledger 300. Only the device or entity with the private key may alter or add to the distributed ledger 300. The device or the entity may comprise an administrator of the distributed ledger 300.

The distributed ledger 300 may comprise a genesis block 310. The genesis block 310 may comprise the first block of the distributed ledger 300. The genesis block 310 may comprise the oldest block or the first block generated of the distributed ledger 300. The genesis block 310 may be associated with a device, such as a computing device. The genesis block 310 may comprise data identifying the computing device. The computing device may be associated with an entity, such as a user, a household, or a service provider. The computing device may generate the genesis block 310. The computing device may generate the distributed ledger entry of the genesis block 310. The computing device may transmit the distributed ledger entry to the distributed ledger 300 or to a network. The computing device may record the distributed ledger entry in the genesis block 310. The computing device may generate the distributed ledger 300. The computing device may generate the subsequent blocks 320, 330, 340 of the distributed ledger 300. The computing device may generate the distributed ledger entries of the subsequent blocks 320, 330, 340. The computing device may transmit the distributed ledger entries of the subsequent blocks 320, 330, 340 to the distributed ledger 300 or to a network.

The genesis block 310 may be associated with an application. The application may comprise a software program. The application may comprise a computing device application or a mobile device application, such as an application for providing access to a service provider's platform. The application may be associated with an entity, such as a user, a household, or a service provider. The application may generate the genesis block 310. The application may generate the distributed ledger entry of the genesis block 310. The application may generate the distributed ledger entry of the genesis block 310 or the genesis block 310 upon activation of the application. Activation of the application may comprise running the application, opening the application, or downloading the application. The application may transmit the distributed ledger entry of the genesis block 310 to the distributed ledger 300 or to a network. The application may record the distributed ledger entry in the genesis block 310. The application may generate the distributed ledger 300. The application may generate the subsequent blocks 320, 330, 340 of the distributed ledger 300. The application may generate the distributed ledger entries of the subsequent blocks 320, 330, 340. The application may transmit the distributed ledger entries of the subsequent blocks 320, 330, 340 to the distributed ledger 300 or to a network.

The distributed ledger 300 may comprise a component of a distributed ledger. The distributed ledger 300 may comprise a branch of another blockchain, such as a general blockchain. The general blockchain may comprise a plurality of branches. Each of the plurality of branches may comprise a blockchain or another plurality of blockchains. The general blockchain may comprise a plurality of blockchains. Each of the plurality of blockchains may comprise a register of associated devices. Each of the plurality of blockchains may be associated with a common entity, such as a user, a household, or a service provider. The general blockchain may comprise a register of devices associated with an entity and each of the plurality of blockchains may comprise a register of devices associated with a sub-entity of the entity. The general blockchain may be associated with a company. Each of the plurality of blockchains may comprise a register of devices associated with a department of the company.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise associated devices. The nodes may comprise devices associated with the blocks 310, 320, 330, 340 of the distributed ledger 300. The nodes may comprise devices identified by the data in the blocks 310, 320, 330, 340 of the distributed ledger 300.

The distributed ledger 300 may be updated. Updating the distributed ledger 300 may comprise generating a distributed ledger entry. Updating the distributed ledger 300 may comprise transmitting a distributed ledger entry to the distributed ledger 300 or a network. Updating the blockchain may comprise recording the distributed ledger entry in a block 310, 320, 330, 340 of the distributed ledger 300. Updating the blockchain may comprise generating a block 310, 320, 330, 340 of the distributed ledger 300.

The distributed ledger 300 may be updated by a computing device or an application. The distributed ledger 300 may be updated by a computing device associated with the distributed ledger 300, such as a computing device identified by data in a block 310, 320, 330, 340 of the distributed ledger 300. The blockchain may be updated by a computing device associated with an entity associated with the blockchain. The distributed ledger 300 may be updated by a device comprising software to access the distributed ledger 300.

The software may comprise an application or custom software. The software may comprise a custom software library. The software may comprise software configured to enable a device to generate a distributed ledger entry. The software may comprise software configured to enable a device to submit the distributed ledger entry to the distributed ledger or to a network of nodes associated with the distributed ledger. The software may be configured to enable a device to compute a distributed ledger address of another device. The distributed ledger address of the other device may be computed based on a public key of the other device. The software may be configured to enable a device to authenticate an entry, such as a block, of the distributed ledger. The software may be configured to enable a device to validate an entry, such as a block. Using the software, the device may validate that the entry is signed by another associated device.

The distributed ledger 300 may be updated by a user. Alternatively, the distributed ledger 300 or a system may be configured such that a user has limited access to the distributed ledger 300. The distributed ledger 300 or the system may be configured such that a user may not update the distributed ledger 300 or may not directly update the distributed ledger 300.

Updating the distributed ledger 300 may comprise generating a distributed ledger entry, such as using the custom software library. Updating the distributed ledger 300 may comprise transmitting the distributed ledger entry to the distributed ledger 300 or a network. Updating the distributed ledger 300 may comprise recording the distributed ledger entry in a new block of the distributed ledger 300. Updating the distributed ledger 300 may comprise generating a new block. Updating the distributed ledger 300 may comprise transmitting a new block to the distributed ledger 300 or a network. Updating the distributed ledger 300 may comprise performing underlying blockchain integration, such as validating a new block or performing a proof to add a new block to the blockchain.

Updating the blockchain may comprise using custom software. The software may comprise a custom software library. The software may comprise software configured to enable a device to generate a distributed ledger entry. The software may comprise software configured to enable a device to submit the distributed ledger entry to the distributed ledger or to a network of nodes associated with the distributed ledger. The software may be configured to enable a device to compute a distributed ledger address of another device. The distributed ledger address of the other device may be computed based on a public key of the other device. The software may be configured to enable a device to authenticate an entry, such as a block, of the distributed ledger. The software may be configured to enable a device to validate an entry, such as a block. Using the software, the device may validate that the entry is signed by another associated device.

A device at a premises may transmit a transaction, such as an access permission, to a miner in a network computing environment. The miner in the network computing environment may generate a block comprising the transaction. The miner in the network computing environment may maintain a secondary distributed ledger and an active distributed ledger. The secondary branch may comprise blocks comprising transactions that are not relevant to the device at the premises. The active branch may comprise blocks comprising transactions that are relevant to the device at the premises. The miner in the network computing environment may add the block with the transaction to the active distributed ledger. The miner in the network computing environment may store the secondary distributed ledger. The miner in the network computing environment may return the active distributed ledger to the device at the premises. The device at the premises may store the active distributed ledger locally. The device at the premises may use the active branch to determine access permissions. The secondary distributed ledger may comprise a distributed ledger, such as the distributed ledger 300. The active distributed ledger may comprise a distributed ledger, such as the distributed ledger 300. The miner in the network computing environment may maintain the secondary distributed ledger and the active distributed ledger without using proof-of-work.

Figure 4:
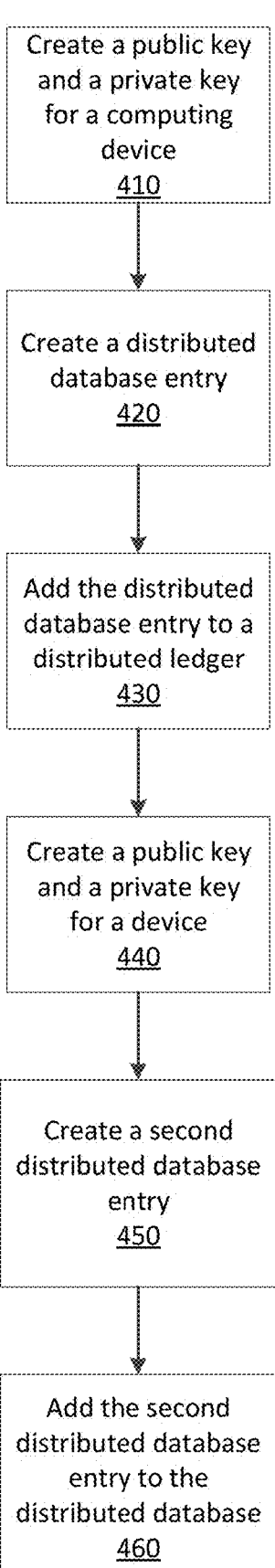
FIG. 4 show an example method for managing device association.

FIG. 4 shows an example method for managing device association using a distributed ledger. At step 410, a private key and a public key pair may be generated for a computing device. The private key and the public key pair may be generated for an application on the computing device. The public key and the private key may comprise a pair. For example, the public key and the private key may be mathematically related. The public key may be configured to decrypt data or content encrypted using the private key. The private key may be configured to decrypt data or content encrypted using the public key. The public key and the private key may be unique to the computing device or to the application on the computing device.

The computing device may comprise, for example, a user device, a mobile device, a laptop computer, a desktop computer, or an IoT device. An IoT device may comprise a device embedded with electronics, such as a circuitry part, a sensor, a camera, an audio input or output, or a lighting unit. An IoT device may have (e.g., or may be configured with) computing capabilities. An IoT device may have (e.g., or may be configured with) network connectivity capabilities. An IoT device may have capabilities (e.g., or may be configured) to collect and exchange data. For example, an IoT device may comprise a personal computer, a mobile phone, a household appliance, a wearable, a gateway device, a health appliance, a premises management system component, a content device, a display, and a vehicle.

The computing device may comprise an administrator of a distributed ledger. The application on the computing device may comprise an administrator of the distributed ledger. The administrator of the distributed ledger may comprise a generator of the distributed ledger. The administrator may update the distributed ledger, such as by adding a block, adding a distributed ledger entry, recording data, or executing a transaction on the distributed ledger. The administrator may manage the distributed ledger, such as by controlling access to the distributed ledger.

The computing device may be associated with an entity, such as a user, a household, or a service provider. The private key and the public key pair may be generated by the computing device. The private key and the public key pair may be generated by a software program on the computing device, such as an application. The application may be associated with an entity, such as a user, a household, or a service provider. The application may generate the private key and public key upon activation. Activation of the application may comprise running the application, opening the application, or downloading the application. Alternatively, the private key and the public key may be assigned by a manufacturer of the computing device. The private key and the public key may be embedded in the computing device by the manufacturer of the computing device.

At step 420, a distributed ledger entry may be generated. The distributed ledger entry may comprise a block of a blockchain, such as the distributed ledger 300 in FIG. 3. The distributed ledger entry may be associated with the computing device. The computing device may generate the distributed ledger entry. The application may generate the distributed ledger entry.

The distributed ledger entry may comprise data associated with the computing device or the application. The distributed ledger entry may comprise data identifying the computing device or the application. The distributed ledger entry may comprise a hash of a key of the computing device, such as a hash of the public key of the computing device. The distributed ledger entry may comprise an address of the computing device. The address may comprise a hash of a key of the computing device, such as a hash of the public key of the computing device. The distributed ledger entry may comprise a timestamp. The timestamp may indicate when the distributed ledger entry was generated or recorded in a block or on a distributed ledger. The distributed ledger entry may comprise a hash of a previous distributed ledger entry or block of a blockchain or a distributed ledger. The block may comprise a signature. The signature may comprise an encryption with a key of the computing device or the application on the computing device, such as an encryption with the private key. The signature may comprise an encryption of one or more of the address, the hash of the key, the timestamp, and the hash of the previous block.

A distributed ledger may be generated. The computing device or the application on the computing device may generate the distributed ledger. The application the computing device may generate the distributed ledger upon activation of the application. The distributed ledger may be generated before the distributed ledger entry is generated. The distributed ledger may be generated on a pre-existing distributed ledger. For example, generating the distributed ledger may comprise generating a branch on a larger distributed ledger, wherein the larger distributed ledger comprises a plurality of branches. The distributed ledger may comprise a register of associated devices. Associated devices may comprise devices associated with a common entity such as a user, a household, or a service provider, for example. A device may use the distributed ledger to vet the identity another device. For example, the device may use the distributed ledger to determine whether another device is associated with the device. The device may use the distributed ledger to determine whether to respond to a communication from another device. The device may determine to respond to the communication based on association of the devices. The device may use the distributed ledger to determine whether to grant another device access to the device or to a proxied device, such as based on association of the devices.

At step 430, the distributed ledger entry may be added to the distributed ledger. The distributed ledger entry may be added by the computing device or the application on the computing device. Adding the distributed ledger entry may comprise transmitting the distributed ledger entry. The distributed ledger entry may be transmitted to the distributed ledger. The distributed ledger entry may be transmitted to a network, such as a distributed network. The distributed ledger entry may be transmitted to one or more nodes, such as computing devices. The nodes may validate the distributed ledger entry or record the distributed ledger entry on the distributed ledger.

Adding the distributed ledger entry may comprise recording the distributed ledger entry. The distributed ledger entry may be recorded in a block of the distributed ledger. The distributed ledger entry may be recorded on the distributed ledger. Adding the distributed ledger entry may comprise adding a block to the distributed ledger. The block may comprise a genesis block, such as the first block or the oldest block in a blockchain. The block may comprise data identifying an entity, such as an address or an identifier.

At step 440, a public key and a private key for a user device may be received or accessed. The public key and the private key may be received or accessed by the computing device or the application on the computing device. The public key and the private key may comprise a pair. For example, the public key and the private key may be mathematically related. The public key may be configured to decrypt data or content encrypted using the private key. The private key may be configured to decrypt data or content encrypted using the public key. The public key and the private key may be unique to the user device.

The user device may comprise, for example, a mobile device, a laptop computer, a desktop computer, or an IoT device. The user device may comprise a software program, such as an application, on another device. The user device may comprise a device associated with the computing device or the application on the computing device. The user device may comprise a device associated with an entity. The user device and the computing device may be associated with a common entity. The user device may comprise a new device, such as a device newly acquired by the entity or newly associated with the entity or the computing device and application. The user device may comprise a device that is not identified in the distributed ledger. The user device may have access to the distributed ledger. For example, the user device may access the distributed ledger over a network. The user device may have capabilities (e.g., or may be configured) to update the distributed ledger.

The public key may be received from the user device. The user device may generate the public key and the private key. The public key and the private key may be assigned by a manufacturer of the user device. The public key and the private key may be embedded in the device by the manufacturer of the user device. The user device may transmit the public key and the private key to the computing device. The user device may transmit the public key and the private key to the computing device upon activation of the user device. Activation of the user device may comprise, for example, turning the user device on or connecting the user device to a network. The user device may transmit the public key and the private key to the computing device in response to a request or a signal from the computing device. The computing device may transmit a request or a signal to the user device in response to receiving a signal from the user device.

A proxy device may generate the public key and the private key for the device. The proxy device may comprise, for example, a user device, a mobile device, a laptop computer, a desktop computer, or an IoT device. The proxy device may comprise a software program, such as an application, on another device. The proxy device may comprise a device associated with the computing device or the application on the computing device. The proxy device may comprise a device associated with an entity. The proxy device and the computing device may be associated with a common entity. The proxy device may have access to the distributed ledger. For example, the proxy device may access the distributed ledger over a network. The proxy device may have capabilities (e.g., or may be configured) to update the distributed ledger.

The user device may not have capabilities (e.g., or may not be configured) to generate the public key and the private key. The proxy device may generate the public key and the private key in response to a request from the user device, such as over a network. The proxy device may generate the public key and the private key in response to a signal from the user device, such as a beacon from the user device. The proxy device may generate the public key and the private key based on detecting the user device, such as upon activation of the user device. The proxy device may transmit the public key and the private key to the computing device. The proxy device may transmit the public key and the private key to the computing device in response to a request or a signal from the computing device.

The computing device or the application on the computing device may generate the public key and the private key for the user device. The computing device or the application may generate the public key and the private key in response to a request from the user device, such as over a network. The computing device or the application may generate the public key and the private key in response to a signal from the user device, such as a beacon from the user device. The computing device or the application may generate the public key and the private key based on detecting the user device, such as upon activation of the user device. The computing device or the application may generate the public key and the private key in response to a user input. The user input may comprise an identification of the user device, a request, or an update of device association data from a user, such as via the application on the computing device.

At step 450, a second distributed ledger entry may be generated. The second distributed ledger entry may comprise a block of a blockchain. The distributed ledger entry may be associated with the user device. The second distributed ledger entry may be generated by the computing device, the application on the computing device, the user device, or the proxy device.

The distributed ledger entry may comprise data associated with the user device. The distributed ledger entry may comprise data identifying the user device. The distributed ledger entry may comprise data associated with the computing device or the application on the computing device.

The distributed ledger entry may comprise a hash of a key of the user device, such as a hash of the public key of the user device. The distributed ledger entry may comprise an address of the user device. The address may comprise a hash of a key of the user device, such as a hash of the public key of the user device. The distributed ledger entry may comprise a timestamp. The timestamp may indicate when the distributed ledger entry was generated or recorded in a block or on a distributed ledger. The distributed ledger entry may comprise a hash of a previous distributed ledger entry or block of a blockchain or a distributed ledger. The hash may comprise a hash of the distributed ledger entry generated in step 420. The block may comprise a signature. The signature may comprise an encryption with a key of the generator of the distributed ledger entry, such as an encryption with the private key. The signature may comprise an encryption of one or more of the address, the hash of the key, the timestamp, and the hash of the previous block.

At step 460, the second distributed ledger entry may be added to the distributed ledger. The second distributed ledger entry may be added by the computing device, the application on the computing device, the user device, or the proxy device. Adding the second distributed ledger entry may comprise transmitting the distributed ledger entry. The second distributed ledger entry may be transmitted to the distributed ledger. The second distributed ledger entry may be transmitted to a network, such as a distributed network. The second distributed ledger entry may be transmitted to one or more nodes, such as computing devices. The nodes may validate the second distributed ledger entry or record the second distributed ledger entry on the distributed ledger.

Adding the second distributed ledger entry may comprise recording the second distributed ledger entry. The second distributed ledger entry may be recorded in a block of the distributed ledger. The block may comprise a block subsequent to a block comprising the distributed ledger entry generated in step 420. The distributed ledger entry may be recorded on the distributed ledger.

Steps 440, 450, and 460 may be repeated for one more other devices. For example, if an entity acquires a new device or another device is identified, a public key and a private key may be generated for the new device. A third distributed ledger entry may be generated comprising data associated with the new device. The third distributed ledger entry may be added to the distributed ledger.

A device may be deleted from the distributed ledger. For example, an entity may lose, sell, or replace the device. The entity may indicate that the device is no longer associated with the entity, the distributed ledger, or devices associated with the distributed ledger. For example, the user may indicate the change in status of the device via the application on the computing device. A distributed ledger entry may be generated indicating that the device is no longer associated with the entity, the distributed ledger, or the associated devices. The distributed ledger entry may be generated by the computing device, the application on the computing device, or another device associated with the entity, the distributed ledger or the associated devices. The distributed ledger entry may be added to the distributed ledger. The distributed ledger entry may be added to the distributed ledger by the computing device, the application on the computing device, or another device associated with the entity, the distributed ledger or the associated devices. Adding the distributed ledger entry may be similar to the processes in Step 430 and Step 460.

Figure 5:
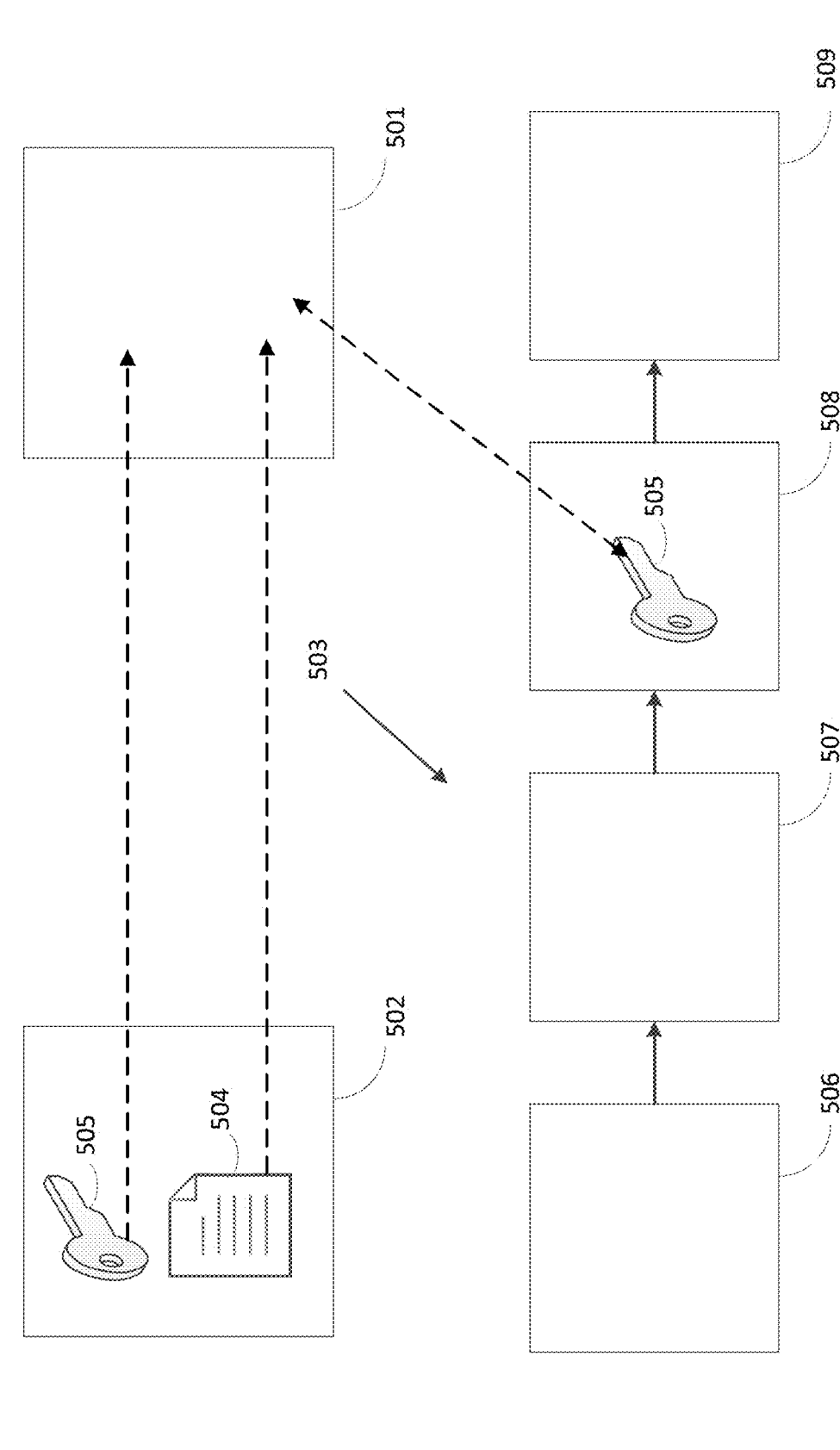
FIG. 5 shows an example system for managing device association.

FIG. 5 shows an example system 500 for managing device association using a distributed ledger 503. The distributed ledger 503 may comprise a blockchain. The distributed ledger 503 may comprise a register of associated devices. The associated devices may comprise devices associated with a common entity, such as a common user, common group of users, common service provider, common account, common household, and/or common premises, as examples.

The distributed ledger 503 may be associated with an entity. The distributed ledger 503 may be unique to the entity. The distributed ledger 503 may be anonymous. For example, the distributed ledger 503 may not comprise data identifying the associated entity. The distributed ledger 503 may not comprise unsecured data identifying the associated entity. The distributed ledger 503 may comprise data identifying the associated entity in a secure or encrypted form. The distributed ledger 503 may comprise data identifying the associated entity in a secure or encrypted form. The data identifying the associated entity in the secure form may be opaque to users or devices examining the distributed ledger 503.

The distributed ledger 503 may comprise a system for establishing peer-to-peer trust among associated devices. A device may use the distributed ledger 503 to vet the identity of another device. Vetting the identity of a device may comprise validating, verifying, or authenticating the identity of the device. Vetting the identity of the device may comprise determining that the device comprises an associated device based on the distributed ledger 503. The distributed ledger 503 may be used for trusted peer-to-peer communication between devices. The distributed ledger 503 may be used for trusted peer-to-peer access between devices.

For example, a recipient device 501 may vet a sender device 502 using the distributed ledger. The recipient device 501 may vet the sender device 502 in response to a communication from the sender device 502. The recipient device 501 and the sender device 502 may each comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device may have (e.g., or may be configured with) computing capabilities. An IoT device may have (e.g., or may be configured with) network connectivity capabilities. An IoT device may have capabilities (e.g., or may be configured) to collect and exchange data. For example, an IoT device may comprise at least one of a personal computer, a mobile phone, a household appliance, a wearable, a gateway device, a health appliance, a premises management system component, a content device, a display, and a vehicle.

The distributed ledger 503 may be stored on the recipient device 501 and/or the sender device 502. The recipient device 501 and/or the sender device 502 may each comprise an application or software for accessing the distributed ledger 503. The software may comprise custom software. The software may comprise a custom software library. The software may comprise software configured to enable a device to generate a distributed ledger entry. The software may comprise software configured to enable a device to submit the distributed ledger entry to the distributed ledger or to a network of nodes associated with the distributed ledger. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The recipient device 501 may receive the communication over a network. The communication may comprise a signal. The communication may comprise data. The communication may comprise a request. For example, the communication may comprise a request to access the recipient device 501. The communication may comprise a request to access a user device and the recipient device 501 may comprise a proxy for the user device. A request to access a device may comprise a request to connect to the device, control the device, or use a function of the device. For example, the recipient device 501 may comprise a thermostat and the sender device 502 may comprise a mobile device. The mobile device may send a communication to the thermostat requesting a change of a temperature setting of the thermostat. The sender device 502 may comprise a smart phone and the recipient device 501 may comprise a laptop computer. The smart phone may send a communication to the laptop computer requesting use of a camera installed on the laptop computer.

The communication may comprise an identifier of the sender device 502. For example, the communication may be signed with a key of the sender device 502, such as a private key of the sender device 502. The communication may comprise a key of the sender device 502, such as a public key 505 paired to the private key of the sender device 502. The recipient device 501 may confirm that the public key 505 is associated with the sender device 502 by decrypting the communication with the provided public key 505. Successful decryption of the communication with the public key 505 may indicate that the sender device 502 has the private key associated with the public key 505.

The recipient device 501 may use the distributed ledger 503 and the public key 505 to determine whether the sender device 502 comprises a device associated with the recipient device 501. The recipient device 501 may determine whether the sender device 502 comprises a device associated with the recipient device 501 based on confirming that the public key is associated with the sender device 502. The recipient device 501 may access the distributed ledger 503. The recipient device 501 may be configured to access the distributed ledger 503 over a network. The recipient device 501 may be configured to access the distributed ledger 503 using a proxy device. The recipient device 501 may access the distributed ledger 503 using software of the recipient device 501 or a custom software library for accessing the distributed ledger 503. The recipient device 501 may search the distributed ledger 503 for the public key 505 of the sender device 502. Searching the distributed ledger may comprise scanning the distributed ledger or querying the distributed ledger.

The recipient device 501 may search the distributed ledger 503 for a distributed ledger entry 508 comprising the public key 505. The distributed ledger entry may comprise a block, such as a block of a blockchain. The recipient device 501 may determine that the sender device 502 comprises a device associated with the recipient device 501. The recipient device 501 may determine that the sender device 502 comprises a device associated with the recipient device 501 based on the distributed ledger entry 508 comprising the key. The distributed ledger entry 508 may indicate that the sender device 502 is associated with a common entity.

The recipient device 501 may respond to the recipient device 501. The recipient device 501 may respond to the recipient device 501 based on the determining that the sender device 502 comprises a device associated with the recipient device 501. Responding to the device 501 may comprise sending a communication, such as to the sender device 502 or to another device. Responding to the device 501 may comprise running a device program or modifying a device setting, for example. If the recipient device 501 determines that the sender device 502 does not comprise an associated device, the recipient device 501 may not respond to the communication. The sender device 502 may deny a request of the recipient device 501.

The recipient device 501 may receive a communication from a requesting sender device 502 comprising a request to access the recipient device 501. The communication may be encrypted with a key of the sender device 502, such as with a private of the requesting device 502. The communication may comprise a key of the requesting device 502, such as the public key 505 paired to the private key of the sender device. The recipient device 501 may confirm that the public key 505 is associated with the sender device by decrypting the communication with the public key 505. Successful decryption of the communication with the public key 505 may indicate that the requesting device 502 has the private key associated with the public key 505.

The recipient device 501 may determine whether the requesting device 502 comprises a device associated with the recipient device 501. The recipient device 501 may determine whether the requesting device 502 comprises a device associated with the recipient device based on confirming that the public key is associated with the requesting device 502. The recipient device 501 may determine whether the requesting device 502 comprises a device associated with the recipient device using the distributed ledger 503 and the public key 505. The recipient device 501 may access the distributed ledger 503. The recipient device 501 may be configured to access the distributed ledger 503 over a network. The recipient device 501 may be configured to access the distributed ledger 503 using a proxy device.

The recipient device 501 may access the distributed ledger 503 using software of the recipient device 501 or a custom software library for accessing the distributed ledger

503. The software may comprise software configured to enable a device to generate a distributed ledger entry. The software may comprise software configured to enable a device to submit the distributed ledger entry to the distributed ledger or to a network of nodes associated with the distributed ledger. The software may be configured to enable a device to compute a distributed ledger address of another device, such as based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The recipient device 501 may search the distributed ledger 503 for the public key 505 of the requesting device 502. Searching the distributed ledger may comprise scanning the distributed ledger or querying the distributed ledger. The recipient device 501 may search the distributed ledger 503 for a distributed ledger entry 508 comprising the public key 505. The distributed ledger entry may comprise a block, such as a block of a blockchain. The recipient device 501 may determine that the requesting device 502 comprises a device associated with the recipient device 501. The recipient device 501 may determine that the requesting device 502 comprises a device associated with the recipient device 501 based on the distributed ledger entry 508 comprising the key. The distributed ledger entry 508 may indicate that the requesting device 502 is associated with a common entity.

The recipient device 501 may grant the requesting device 502 access to the recipient device 501. The recipient device 501 may grant the requesting device 502 access to the recipient device 501 based on the determining that the requesting device 502 comprises a device associated with the recipient device 501. The recipient device 501 may grant the requesting device 502 access to another device, such as a proxied device. The recipient device 501 may respond to the requesting device 502 by sending a communication.

Figure 6:
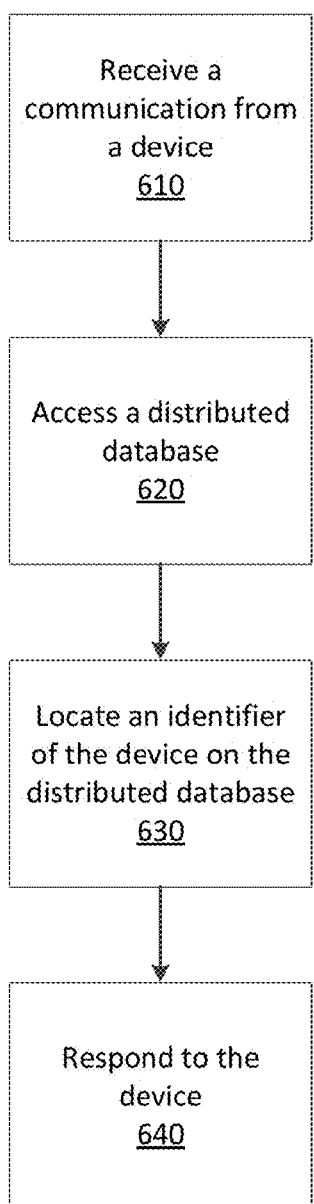
FIG. 6 shows an example method for managing device association.

FIG. 6 shows an example method for managing device association using a distributed ledger. At step 610, a communication may be received from a device. The communication may be received by a first device from a second device.

The first device and the second device may each comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device have (e.g., or may be configured with) computing capabilities. An IoT device may have (e.g., or may be configured with) network connectivity capabilities. An IoT device may have capabilities (e.g., or may be configured) to collect and exchange data. For example, an IoT device may comprise at least one of a personal computer, a mobile phone, a household appliance, a wearable, a gateway device, a health appliance, a premises management system component, a content device, a display, and a vehicle. The first device and the second device may each comprise an application or software for accessing a distributed ledger. The software may comprise custom software. The software may comprise a custom software library.

The communication may be received over a network, such as a local area network, a wide area network, a communication network, a data network, a content network, or a secure network. The communication may comprise a signal. The communication may comprise data. The communication may comprise a request. For example, the communication may comprise a request to access the first device. The communication may comprise a request to access a user device. The first device may comprise a proxy for the user device. A request to access a device may comprise a request to connect to the device, control the device, or use a function of the device.

The communication may comprise an identifier of the second device. For example, the communication may be signed with a key of the second device, such as a private key of the second device. The communication may comprise a key of the second device, such as a public key paired to the private key of the second device. The communication may be validated by decrypting the communication using the public key. Successful decryption of the communication with the public key may indicate that the second device has the private key associated with the public key.

The identifier may comprise an address of the second device. The identifier may comprise a public key of the second device. An address of the second device may be determined, such as based on the public key. For example, one or more hash functions may be performed using the public key to output the address of the second device.

At step 620, a distributed ledger may be accessed. The first device may access a distributed ledger. The distributed ledger may be like the distributed ledger 300 in FIG. 3. The distributed ledger may comprise a blockchain. The distributed ledger may comprise a register of associated devices. The distributed ledger may comprise a register of associated devices. The associated device may comprise devices associated with a common entity, such as a user, a household, or a service provider, for example. The distributed ledger may comprise data identifying the first device.

The distributed ledger may be associated with an entity. The distributed ledger may be unique to the entity. The distributed ledger may be anonymous. For example, the distributed ledger may not comprise data identifying the associated entity. The distributed ledger may not comprise unsecured data identifying the associated entity. The distributed ledger may comprise data identifying the associated entity in a secure or encrypted form. The data identifying the associated entity in the secure form may be opaque to users or devices examining the distributed ledger.

The distributed ledger may comprise a system for establishing peer-to-peer trust among associated devices. A device may use the distributed ledger to vet the identity of another device. Vetting the identity of a device may comprise validating, verifying, or authenticating the identity of the device. For example, a device may vet the identity of another device by locating an identifier of the other device on the distributed ledger.

The distributed ledger may be accessed over a network. The distributed ledger may be accessed using software, an application, or a custom software library for accessing the distributed ledger. The first device may access the distributed ledger via a proxy device.

At step 630, the identifier of the second device may be located on the distributed ledger. The first device may locate the identifier of the second device on the distributed ledger. One or more entries of the distributed ledger may be decrypted, such as using the public key of the second device. The first device may determine an entry generated by the second device. The first device may determine an entry generated by the second device based on successful decryption of the entry with the public key of the second device.

The distributed ledger may be searched, such as using the identifier of the second device. The identifier may comprise the public key of the second device. The identifier may comprise the address of the second device. Searching the distributed ledger may comprise scanning the distributed ledger or querying the distributed ledger. The distributed ledger may be searched for a distributed ledger entry comprising the identifier. The distributed ledger entry may comprise a block, such as a block of a blockchain or a transaction. It may be determined that the second device comprises a device associated with the first device. It may be determined that the second device comprises a device associated with the first device based on the distributed ledger entry comprising the identifier. It may be determined that the second device and the first device are associated with a common entity. It may be determined that the second device comprises a device authorized to access the first device or another device.

At step 640, a response may be issued to the second device. The first device may respond to the second device. The response may comprise a response to the communication from the second device in step 610. The response may be based on the locating the identifier of the second device on the distributed ledger. The response may be based on the confirming that the second device comprises an associated device or an authorized device.

Responding to the second device may comprise transmitting a communication to the second device. Responding may comprise running a device program or modifying a device setting, at the first device, for example. Responding may comprise granting the second device access to the first device or to a proxied device. If it is determined that the second device does not comprise an associated device or an authorized device, a response may not be issued. Responding may comprise denying access to the first device or to a proxied device. Responding may comprise declining a request. Responding may comprise blocking the second device, such as blocking communications from the second device to the first device.

Figure 7:
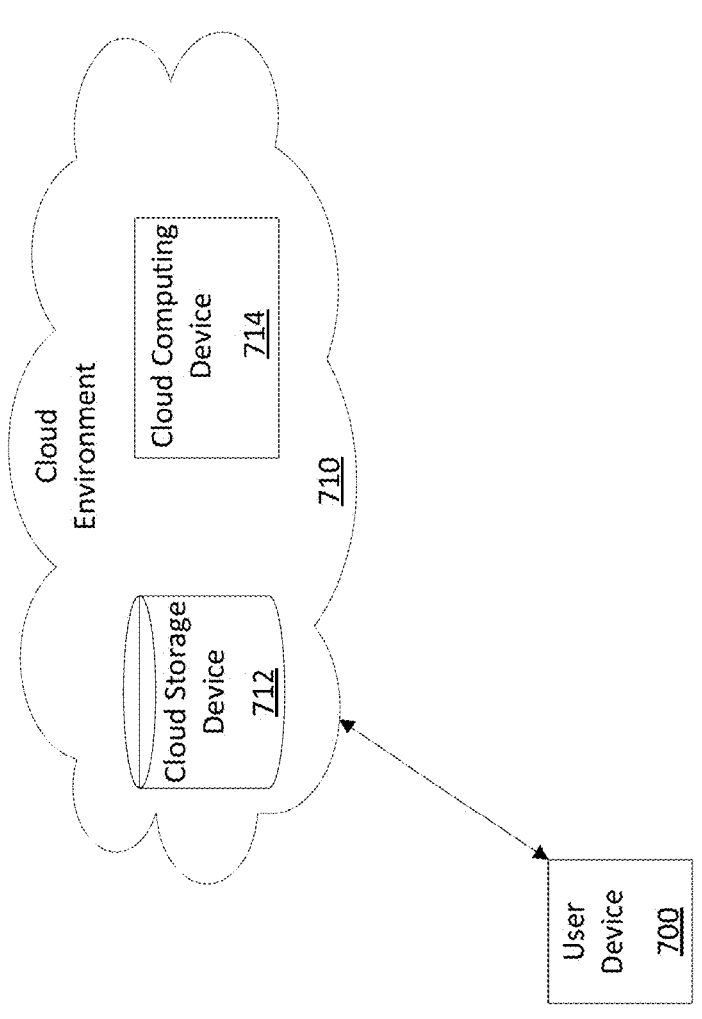
FIG. 7 shows an example system environment.

FIG. 7 shows an example system environment. The system environment may comprise a user device 700. The user device 700 may comprise a device located at a premises. The user device 700 may comprise an IoT device. The user device 700 may comprise a gateway device, a cable modem, a set-top box, a router, a mobile device, a peripheral device, such as a camera or a printer, a wearable computing device, a smart phone, a tablet, a laptop, a desktop computing device, any personal computing device, and/or any combination of the foregoing, as examples. The user device 700 may be in communication with a network environment 710 via one or more network links. The user device 700 may communicate with the network environment 710 using a networking protocol, such as internet protocol (IP). The user device 700 may communicate with the network environment 710 through another user device. The user device 700 and/or the other user device may communicate using a messaging protocol, such as Wi-Fi or Bluetooth.

The user device 700 may comprise an administrator of one or more distributed ledgers, such as the distributed ledger 503 in FIG. 5. The distributed ledgers may be associated with associated devices. The distributed ledgers may comprise indications of permissions of user devices. The user device 700 may be configured to add permissions to the distributed ledgers, such as based on receiving indications of the permissions via an application installed on the user device 700. The user device 700 may be similar to the recipient device 501 in FIG. 5.

The network environment 710 may comprise a cloud storage device 712 and a network computing device 714. The network storage device 712 may comprise memory. The network storage device 712 may comprise data accessible to the network computing device 714. The cloud storage device 712 may comprise data written by the network computing device 714. The network computing device 714 may comprise a miner.

The user device 700 may receive an indication of an update to device permissions, such as via a user input received via an application installed on the user device 700. The user device 700 may receive an indication to add a user as an authorized user of the user device 700, an associated user device, and/or an account. The user device 700 may receive an indication to add another user device, such as an IoT device, to the account. The account may be associated with a user, a group of users, a premises, and/or a household, as examples.

The user device 700 may generate a transaction indicative of the received command. The user device 700 may send the transaction to the network environment 710. The network environment 710 may route the transaction to the cloud computing device 714. The network computing device 714 may add the transaction to a block of a blockchain. The network computing device 714 may examine the blocks of the blockchain to determine which blocks comprise transactions relevant to the user device 700 and/or the other user device at the current time and date, and classify those blocks as "active." Blocks classified as "active" may be used to generate an active branch of the blockchain (or an active blockchain). Blocks not classified as "active" may be used to generate a secondary branch of the blockchain (or a secondary blockchain). The network computing device 714 may generate the active branch and return the active branch to the user device 700. The network computing device 714 may generate the secondary branch and store the secondary branch in the network storage device 712. The user device 700 may cause the active branch to be stored locally, such as on the other user device.

FIG. 8 shows an example block 800 of a blockchain. The block 800 may be one or more of blocks 902, 904, 906, 908 from FIG. 9 and/or one or more of blocks 1012, 1014, 1016, 1018, 1022, 1024 from FIG. 10. Although the block 800 comprises one record (e.g., transaction, etc.), a block may comprise any number of records. Each block may have a constant size, such as 1 kiloByte. The block 800 may comprise a header section and an input section. The header section may comprise various fields. The header section may comprise a block height field. The block height field may indicate a number of blocks in a blockchain. The header section may comprise a merkle root hash field. The merkle root field may indicate a hash of transaction hashes in the block 800. The header section may comprise a nonce field. The nonce field may indicate a counter used by miners, such as the nodes 110 in FIG. 1, to generate a correct hash. The header section may comprise a previous block hash field. The header section may comprise a timestamp field. The header section may comprise a version field.

The input section of the block 800 may comprise various fields. The input section may comprise a public key field. The input section may comprise a signature field. The input section may comprise an input node. The input section may comprise a beginning date field. The input section may comprise a field indicating a time for permissions and/or rights granted by the transaction. The input section may comprise a field indicating an output node. The input section may comprise a field indicating a target node. The input section may comprise a field indicating a transaction identifier. The input section may comprise a field indicating an action, such as a description of what permissions and/or rights the transaction comprises. The input section may comprise an expiration date field. The input section may comprise a field indicating time for permissions and/or rights granted by the transaction. The input section may comprise a field indicating a ledger identifier. The ledger identified may be used for identifying the blockchain associated with the account related to the transaction.

The block 800 and/or the record in the block 800 may be verified using values in a "publicKey" field and a "signature" field. A value in "inputNode" may identify a device associated with a user generating the record (e.g., the user granting the rights and/or permissions that are a subject of the record, etc.). A value in "outputNode" may identify a device associated with a user receiving the rights and/or permissions that are the subject of the record. A value in "targetNode" may identify a device that is the subject of the rights and/or permissions. A value in "inputNode" may identify a mobile device associated with a primary account holder that is granting rights to access a camera to a second user; the value in "outputNode" may identify a mobile device associated with the second user; and the value in "targetNode" may identify the camera.

A value in "action" may indicate that the second user is allowed to access the camera. A value in "notBefore" may indicate that the second user is allowed to access the camera immediately. A value in "exp" may indicate that the access allowed does not expire and the second user will be allowed to access the camera until permission to access the camera is revoked by the primary account holder.

FIG. 9 shows an example blockchain 900. The example blockchain 900 may be a conceptual model that is not stored by the systems and/or methods described herein. The example blockchain 900 may be generated by merging (e.g., reconstructing, etc.) the secondary blockchain (i.e., active branch 1010 and secondary branch 1020) of FIG. 10. The blockchain 900 may comprise a genesis block 902, a first transaction block 904, a second transaction block 906, and a third transaction block 908. The genesis block may point (e.g., link, refer, etc.) to the first transaction block 904.

The first transaction block 904 may comprise information regarding a transaction. The first transaction block 904 may not expire. The first transaction block 904 may point to the second transaction block 906. The second transaction block 906 may comprise information regarding a transaction. The second transaction block 906 may already be expired. The second transaction block 906 may point to the third transaction block 908. The third transaction block 908 may comprise information regarding a transaction. The third transaction block 908 may not expire. The third transaction block 908 may point to null, or otherwise indicate a terminal block of the blockchain 900.

Figure 10:
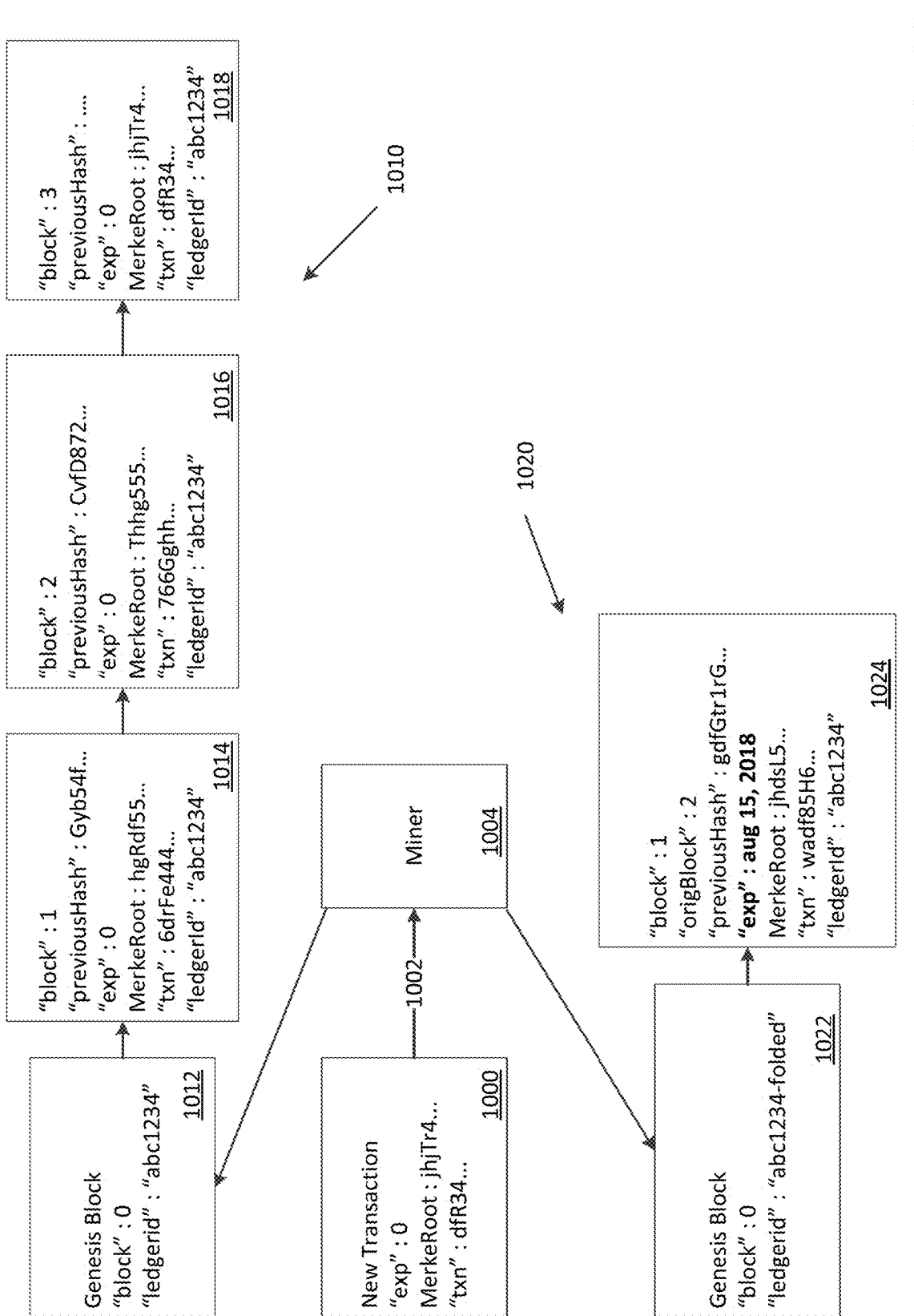
FIG. 10 shows an example secondary blockchain.

FIG. 10 shows an example blockchain, such as the blockchain 900 that has been bifurcated into an active branch 1010 and a secondary branch 1020. The active branch 1010 and the secondary branch 1020 may comprise distinct blockchains. The active branch 1010 may comprise a genesis block 1012. Block 1014 may correspond to block 904 of FIG. 9. Block 1016 may correspond to block 908 in FIG. 9. The active branch 1010 may comprise active transaction blocks, such as block 1014 and 1016.

The secondary branch 1020 may comprise a genesis block 1022. The secondary branch 1020 may comprise blocks with inactive transactions (such as revoked or expired transactions), such as block 1024. Block 1024 may correspond to block 906 in FIG. 9.

A user device may send a new transaction 1000 to a miner 1004 at 1002. The user device may comprise any device at a premises, such as an IoT device, a gateway device, a cable modem, a set-top box, a router, a mobile device, a peripheral device, such as a camera or a printer, a wearable computing device, a smart phone, a tablet, a laptop, a desktop computing device, any personal computing device, the like, and/or any combination of the foregoing. The miner may comprise one or more network computing devices. The miner may comprise the network computing device 714 in FIG. 7. The transaction 1000 may be transmitted to the miner 1004 at 1002 using a communication protocol, such as internet protocol (IP). The miner 1004 may generate a block 1018 using the transaction. The miner may add the block 1018 to the active branch 1010. Adding the block 1018 to the active branch 1010 may comprise generating a new version of the active branch 1010 comprising the block 1018.

The miner 1004 may fold the blockchain, such as in response to receiving a new transaction. Folding the blockchain may comprise moving blocks from the active blockchain 1010 to the secondary branch. Moving the blocks from the active branch 1010 to the secondary branch 1020 may comprise generating a new version of the active branch 1010 that does not comprise the blocks. Moving the blocks from the active branch 1010 to the secondary branch 1020 may comprise generating a new version of the active branch 1010 that comprises different blocks. Moving the blocks may comprise adding the blocks to the secondary branch 1020. The miner 1004 may move block 1024 to the secondary branch 1020 based on the miner adding the block 1018 to the active branch 1010.

Figure 11:
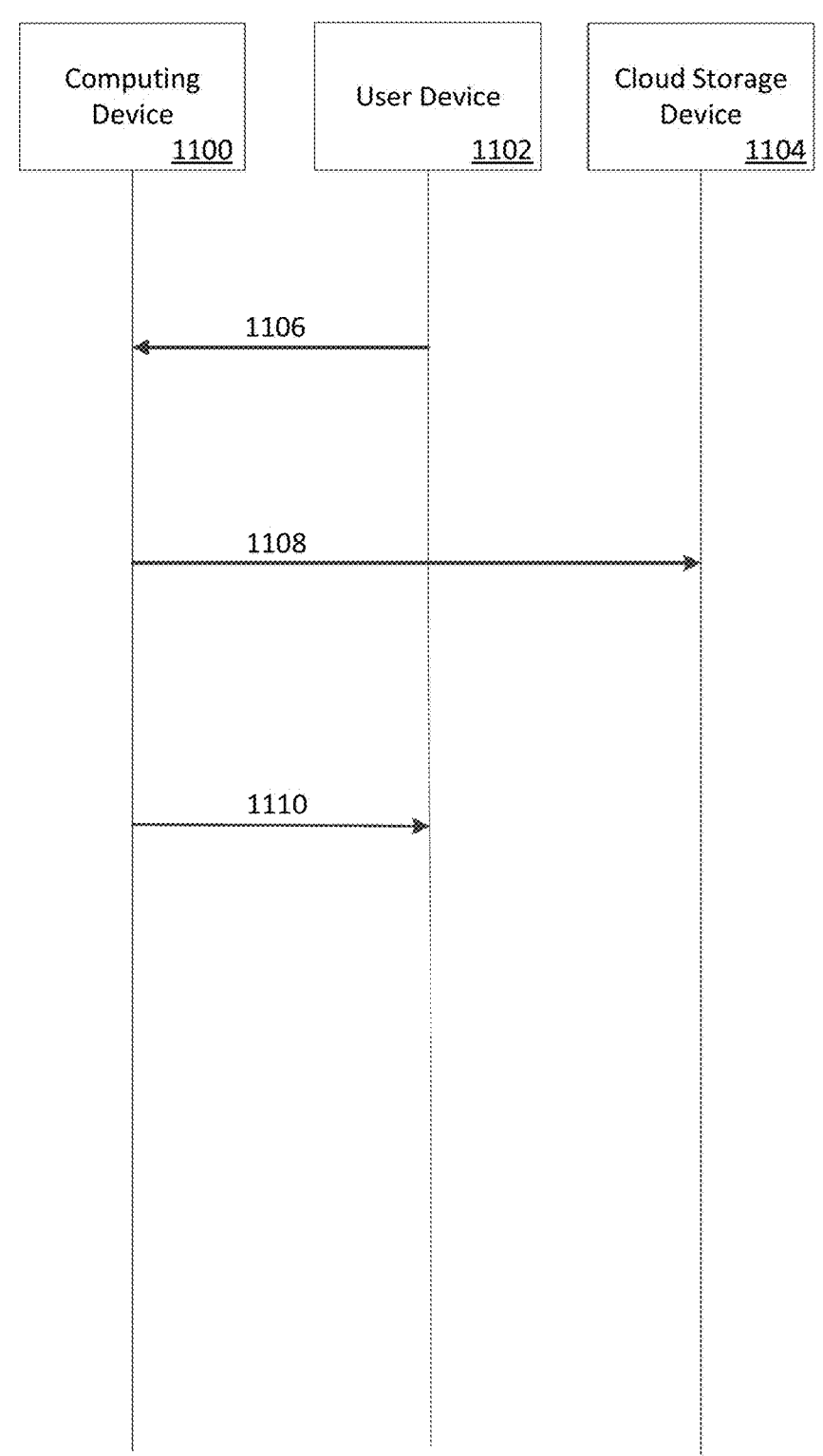
FIG. 11 shows an example sequence diagram.

FIG. 11 shows an example sequence of managing a distributed ledger. The sequence diagram may comprise a computing device 1100, a user device 1102, and a network storage device 1104. The computing device 1100 may comprise a network computing device. The computing device 1100 may comprise a miner. The computing device 1100 may correspond to the network computing device 714 in FIG. 7. The user device 1102 may comprise any device at a premises, such as an IoT device, a gateway device, a cable modem, a set-top box, a router, a mobile device, a peripheral device, such as a camera or a printer, a wearable computing device, a smart phone, a tablet, a laptop, a desktop computing device, any personal computing device, the like, and/or any combination of the foregoing. The user device 1102 may correspond to the user device 700 in FIG. 7.

The network storage device 1104 may comprise a cloud computing device. The network storage device 1104 may comprise memory in a network computing environment. The network computing environment may comprise a network computing environment. The network computing environment may be readable, writable, and/or accessible by the computing device 1100. The network storage device 1104 may correspond to the network storage device 712 in FIG. 7.

The user device 1102 may receive an indication to update permissions related to the user device 1102 and/or another user device. The indication may be received by a user via an application installed on the user device 1102. The user device 1102 may receive an indication to add a user as an authorized user of the user device 1102 or an account. The user device 1102 may receive an indication to add another user device, such as an IoT device, to the account. The account may be associated with a user, a group of users, and/or a household, as examples.

The user device 1102 may generate a transaction related to the received indication. At 1106, the user device 1102 may transmit the transaction to the computing device 1100. The computing device 1100 may determine that one or more blocks in an active branch are no longer "active." An inactive block may comprise a block that is no longer applicable to the user device 1102. The computing device 1100 may remove the inactive blocks from the active branch. The computing device 1100 may transfer the removed blocks to the network storage device 1104 at 1108. The network storage device 1104 may store the removed blocks in a secondary branch. The computing device 1100 may add a block with the transaction received from the user device 1102 at 1106 to the primary branch. The computing device 1100 may add the block by generating an updated version of the primary branch that comprises the block. The computing device 1100 may cause the updated version of the primary branch to be stored the user device 1102 at 1110.

FIG. 12 shows an example method of managing a distributed ledger. At step 1210, an indication of a new distributed ledger record entry may be received. The indication of the new distributed ledger record entry may be received by a computing device, such as user device 700 in FIG. 7.

The new distributed ledger record entry may indicate a new permission associated with a user device. The user device may comprise at least one of an Internet of Things (IoT) device, a security system device, a home automation device, or a premises management system device. The user device may comprise at least one of a mobile phone, a laptop, a tablet, a wearable device, a gaming device, a television, a vehicle, or a set-top box. The user device may comprise at least one of a lighting device, a sensor device, an alarm device, a temperature control device, a lighting control device, a lock device, a communication device, a camera device, or a home appliance device.

The receiving the indication of the new distributed ledger record entry may comprise receiving the indication of the new distributed ledger record entry from the user device. The receiving the indication of the new distributed ledger record entry may comprise receiving the indication of the new distributed ledger record entry from an account associated with the user device. The receiving the indication of the new distributed ledger record entry may comprise receiving the indication of the new distributed ledger record entry from another device associated with the user device, such as a different user device owned by a common user or associated with a common account or household. The other device may comprise a controller device of a plurality of user devices. The plurality of user devices may comprise the user device. The other device may comprise a manager of device associations, such as a device installed with an application configured to enable a user to add or remove devices and/or users to an account.

The new permission may comprise a permission for at least one computing device to at least one of control, communicate with, or access data stored on the user device. The computing device may comprise another user device. The computing device may be associated with a different user than a user of the user device. The new permission may comprise a permission for at least one user to at least one of control, communicate with, or access data stored on the user device. The new permission may be based on a received user input. The received user input may indicate a grant of permission to the user device.

At step 1220, a determination may be made that a distributed ledger record indicates an inactive (e.g., not valuable, invalid, expired, no longer useful or needed, etc.) permission associated with the user device. The determination may be made based on the receiving the indication of the new distributed ledger record entry. The determination may be made by the computing device.

The distributed ledger record may be on a first primary distributed ledger. The first primary distributed ledger may be referred to as a first active distributed ledger. The first primary distributed ledger may be stored on the user device. The inactive permission may comprise at least one of an expired permission, a revoked permission, or a permission associated with a compromised account. The expired permission may comprise a permission with at least one of a time or a date that has lapsed. The revoked permission may comprise a permission granted to the user device by a user. A received user input may indicate a revocation of the permission. The compromised account may comprise an account with a compromised password. The compromised account may comprise an account accessed by an unauthorized device.

At step 1230, the distributed ledger record may be caused to be added to a secondary distributed ledger. The computing device may cause the distributed ledger record to be added to a secondary distributed ledger. The secondary distributed ledger may be stored on a cloud device, such as the network device 714 or the network storage device 712 in FIG. 7. The secondary distributed ledger may comprise distributed ledger records indicating inactive permissions associated with the user device. The secondary distributed ledger may comprise a blockchain.

At step 1240, a second primary distributed ledger may be generated. The second primary distributed ledger may be referred to as a second active distributed ledger. The computing device may generate the second primary distributed ledger. The second primary distributed ledger may comprise the new distributed ledger record entry. The second primary distributed ledger may not comprise the inactive distributed ledger record. At least one of the first primary distributed ledger or the second primary distributed ledger may comprise a blockchain. A size of the second primary distributed ledger may be based on a size of a storage medium of the user device.

An original distributed ledger comprising the distributed ledger record indicating the inactive permission and the new distributed ledger record entry may be generated. The original distributed ledger may be generated based on the second primary distributed ledger and the secondary distributed ledger, such as by the computing device and/or the network computing device. The inactive distributed ledger record may comprise an indication of a position of the inactive distributed ledger record in the original distributed ledger. The generating the original distributed ledger may be based at least on the indication of the position of the inactive distributed ledger record in the original distributed ledger.

The generating the second primary distributed ledger may comprise determining a hash. The hash may be determined based on a plurality of distributed ledger records on the first primary distributed ledger. The plurality of distributed ledger records may not comprise the inactive distributed ledger record. A distributed ledger record comprising the hash may be caused to be stored on the user device, such as by the network computing device and/or the computing device.

At step 1250, the second primary distributed ledger may be caused to be stored on the user device, such as by the network computing device and/or the computing device. Causing the second primary distributed ledger to be stored on the user device may comprise sending the second primary distributed ledger to the user device. The first primary distributed ledger may be removed from the user device, such as by erasing the first primary distributed ledger from the memory of the user device.

A user may use an application executing on a smart phone to request that a laptop be allowed to access a Wi-Fi network provided by a Wi-Fi router. The Wi-Fi router may comprise a primary distributed ledger used to determine if a device requesting access has permissions required for the requested access. The primary distributed ledger may comprise a block comprising an expired transaction related to a tablet. The application may generate a transaction, wherein the transaction indicates that the laptop should be allowed to access the Wi-Fi router. The application may cause the transaction to be transmitted from the smart phone, through the Wi-Fi router, to a miner in a network computing environment.

The miner may load the primary distributed ledger. The miner may add the block comprising the expired transaction related to the tablet to a folder ledger stored in a network storage device, such as on a cloud storage device. The miner may recreate the primary distributed ledger without the block comprising the expired transaction related to the tablet. The miner may add a block comprising the transaction that indicates that the laptop should be allowed to access the Wi-Fi router to the recreated primary distributed ledger. The miner may transmit the recreated primary distributed ledger to the Wi-Fi router. The Wi-Fi router may replace the primary distributed ledger with the recreated primary distributed ledger.

As an example, a user may open an application installed on a mobile phone. The application may comprise a list of devices owned by the user. The user may input a selection to grant another user access to a camera device owned by the user from a first date and a first time to a second date and a second time. The mobile phone may generate a distributed ledger record comprising an indication that the other user is granted access to the camera device from the first date and first time to the second date and second time. The mobile phone may send the distributed ledger record to a server.

The server may determine a primary distributed ledger associated with the camera device. The server may determine a primary distributed ledger associated with the camera device based on receiving the distributed ledger record from the mobile phone. The server may determine that the primary distributed ledger comprises a distributed ledger record indicating access granted to the camera with an expiration date that has lapsed. The server may cause the expired distributed ledger record to be stored on a secondary distributed ledger associated with the camera device that may be stored on a network, such as the cloud.

The server may generate an updated primary distributed ledger that comprises the distributed ledger record received from the mobile phone and does comprise the expired distributed ledger record. The server may send the updated distributed ledger to the camera device. The camera device may erase an earlier version of the primary distributed ledger from local memory and may save the updated primary distributed ledger to the local memory.

FIG. 13 shows an example method of managing a distributed ledger. At step 1310, an indication of a distributed ledger record entry associated with a user device may be received by a computing device. The network computing device 714 in FIG. 7 may receive an indication of a distributed ledger record entry associated with the user device 700 in FIG. 7. The user device may comprise at least one of an Internet of Things (IoT) device, a security system device, a home automation device, or a premises management system device. The user device may comprise at least one of a mobile phone, a laptop, a tablet, a wearable device, a gaming device, a television, a vehicle, or a set-top box. The user device may comprise at least one of a lighting device, a sensor device, an alarm device, a temperature control device, a lighting control device, a lock device, a communication device, a camera device, or a home appliance device. The distributed ledger record entry may indicate a new permission associated with the user device.

At step 1320, a distributed ledger record may be determined. The distributed ledger record may be determined based on the receiving the indication of the distributed ledger record entry. The network computing device 714 in FIG. 7 may determine a distributed ledger record. The distributed ledger record may be determined based on the receiving the indication of the distributed ledger record entry. The distributed ledger record may be on a first distributed ledger stored on the user device. The distributed ledger record may be on a first distributed ledger stored on the user device 700 in FIG. 7. The determining the distributed ledger record may comprise determining that the distributed ledger record comprises an inactive distributed ledger record. The inactive distributed ledger record may comprise an indication of an inactive permission associated with the user device.

The inactive permission may comprise at least one of an expired permission, a revoked permission, or a permission associated with a security compromise. The expired permission may comprise a permission with at least one of a time or a date that has lapsed. The revoked permission may comprise a permission granted to the user device by a user. A received user input may indicate a revocation of the permission. The security compromise may comprise a compromise of the user device. The security compromise may comprise a compromise of an account associated with the user device.

At step 1330, the distributed ledger record may be caused to be added to a second distributed ledger. The network computing device 714 in FIG. 7 may cause the distributed ledger record to be added to a second distributed ledger. The second distributed ledger may be stored on a server. The second distributed ledger may be stored on a network computing device. The second distributed ledger may comprise inactive distributed ledger records associated with the user device. The inactive distributed ledger records may comprise indications of at least one of an expired permission, a revoked permission, or a permission associated with a security compromise.

At step 1340, a third distributed ledger may be generated. The network computing device 714 in FIG. 7 may generate a third distributed ledger. The third distributed ledger may comprise the distributed ledger record entry and may not comprise the distributed ledger record. The third distributed ledger may comprise valid distributed ledger records from the first distributed ledger. The valid distributed ledger records may comprise indications of valid permissions associated with the user device. The valid permissions associated with the user device may comprise at least one of an unexpired permission associated with the user device, an unrevoked permission associated with the user device, or a permission that is not associated with a security compromise.

The third distributed ledger may comprise a version of the first distributed ledger. Inactive distributed ledger records of the first distributed ledger may be pruned from the version. The inactive distributed ledger records may comprise indications of inactive permissions associated with the user device. The inactive permissions associated with the user device may comprise at least one of an expired permission, a revoked permission, or a permission associated with a security compromise. At least one of the first distributed ledger, the second distributed ledger, or the third distributed ledger may comprise an indication of a blockchain.

A size of the third distributed ledger may be based on a size of a storage medium of the user device. An original distributed ledger comprising the distributed ledger record entry and the distributed ledger record may be generated. The original distributed ledger may be generated based on the third distributed ledger and the second distributed ledger. The network computing device 714 in FIG. 7 may generate an original distributed ledger comprising the distributed ledger record entry and the distributed ledger record. The original distributed ledger may be generated based on the third distributed ledger and the second distributed ledger. The generating the third distributed ledger may comprise determining a hash. The hash may be determined based on a plurality of distributed ledger records on the first distributed ledger. The plurality of distributed ledger records may not comprise the distributed ledger record. The third distributed ledger may comprise the hash.

At step 1350, the third distributed ledger may be caused to be stored on the user device. The network computing device 714 in FIG. 7 may cause the third distributed ledger to be stored on the user device 700 in FIG. 7. The causing the third distributed ledger to be stored on the user device may comprise causing the first distributed ledger to be removed from the user device.

A miner in a network computing environment may receive a transaction from a Wi-Fi router. The transaction may indicate that a laptop is allowed to access the Wi-Fi router. The Wi-Fi router may comprise a first distributed ledger to determine if a device requesting access has permissions required for the requested access. The first distributed ledger may comprise a block comprising an expired transaction related to a tablet. The miner may add the block comprising the expired transaction related to the tablet to a second distributed ledger stored in a network storage device. The miner may generate a third distributed ledger. The third distributed ledger may be similar to the first distributed ledger, except that the third distributed ledger may not comprise the block comprising the expired transaction related to the tablet and the third distributed ledger comprises a block comprising the transaction indicating that the laptop is allowed to access the Wi-Fi router. The miner may transmit the third distributed ledger to the Wi-Fi router. The Wi-Fi router may replace the first distributed ledger with the third distributed ledger.

As an example, a user may access a digital content service provider website using a laptop computer. The user may log onto an account on the website. The user may input a selection to add a set-top box to the account. The laptop computer may generate a distributed ledger record comprising an indication that the set-top box is associated with the account. The laptop computer may send the distributed ledger record to a server.

The server may determine a primary distributed ledger associated with the account. The server may determine a primary distributed ledger associated with the account based on receiving the distributed ledger record from the laptop. The server may determine that the primary distributed ledger comprises an older distributed ledger record indicating that a gateway device is associated with the account. The server may determine that the gateway device was associated with a security breach. Based on the determination that the gateway device was associated with the security breach, the server may cause the older distributed ledger record to be stored on a secondary distributed ledger associated with the account.

The server may generate an updated primary distributed ledger that comprises the distributed ledger record received from the laptop and does comprise the older distributed ledger record. The server may send the updated distributed ledger to the set-top box. The set-top box may save the updated primary distributed ledger to local memory.

FIG. 14 shows an example method of managing a distributed ledger. At step 1410, an inactive (e.g., not valuable, invalid, expired, no longer useful or needed, etc.) distributed ledger record on a first distributed ledger may be determined. The network computing device 714 in FIG. 7 may determine an inactive distributed ledger record on a first distributed ledger. The first distributed ledger may be stored on a user device. The first distributed ledger may be stored on the user device 700 in FIG. 7. The user device may comprise at least one of an Internet of Things (IoT) device, a security system device, a home automation device, or a premises management system device. The user device may comprise at least one of a mobile phone, a laptop, a tablet, a wearable device, a gaming device, a television, a vehicle, or a set-top box. The user device may comprise at least one of a lighting device, a sensor device, an alarm device, a temperature control device, a lighting control device, a lock device, a communication device, a camera device, or a home appliance device.

The determining the inactive distributed ledger record may be based on receiving a new distributed ledger record entry. The new distributed ledger record entry may comprise a new permission associated with the user device. The determining the inactive distributed ledger record may comprise determining that the inactive distributed ledger record comprises an inactive distributed ledger record entry. The inactive distributed ledger record may comprise an indication of an inactive permission associated with the user device. The inactive permission may comprise at least one of an expired permission, a revoked permission, or a permission associated with a security compromise. The expired permission may comprise a permission with at least one of a time or a date that has lapsed. The revoked permission may comprise a permission granted to the user device by a user. A received user input may indicate a revocation of the permission. The security compromise may comprise a compromise of the user device. The security compromise may comprise a compromise of an account associated with the user device.

At step 1420, the inactive distributed ledger record may be caused to be added to a second distributed ledger. The inactive distributed ledger record may be caused to be added to the second distributed ledger based on the determining the inactive distributed ledger record. The network computing device 714 in FIG. 7 may cause the inactive distributed ledger record to be added to a second distributed ledger. The inactive distributed ledger record may be caused to be added to the second distributed ledger based on the determining the inactive distributed ledger record. The second distributed ledger may be stored on a computing device. The second distributed ledger may be stored on the network storage device 712 in FIG. 7. The second distributed ledger may be stored on a server. The second distributed ledger may be stored on a network computing device. The second distributed ledger may comprise inactive distributed ledger records associated with the user device. The inactive distributed ledger records may comprise indications of at least one of an expired permission, a revoked permission, or a permission associated with a security compromise. The second distributed ledger may be stored on another device.

At step 1430, a third distributed ledger may be generated. The third distributed ledger may be generated based on the determining the inactive distributed ledger record. The network computing device 714 in FIG. 7 may generate a third distributed ledger based on the determining the inactive distributed ledger record. The third distributed ledger may comprise at least one valid distributed ledger record associated with the user device. The third distributed ledger may comprise at least one valid distributed ledger record associated with the user device 700 in FIG. 7. The third distributed ledger may not comprise the inactive distributed ledger record. The third distributed ledger may comprise valid distributed ledger records from the first distributed ledger. The valid distributed ledger records may comprise indications of valid permissions associated with the user device. The valid permissions associated with the user device may comprise at least one of an unexpired permission associated with the user device, an unrevoked permission associated with the user device, or a permission that is not associated with a security compromise.

The third distributed ledger may comprise a version of the first distributed ledger. Inactive distributed ledger records of the first distributed ledger may be pruned from the version. The inactive distributed ledger records may comprise an inactive transaction type. The inactive distributed ledger records may comprise indications of inactive permissions associated with the user device. The inactive permissions associated with the user device may comprise at least one of an expired permission, a revoked permission, or a permission associated with a security compromise.

At least one of the first distributed ledger, the second distributed ledger, or the third distributed ledger may comprise an indication of a blockchain. The at least one valid distributed ledger record may indicate at least one of an unexpired permission associated with a user or an unexpired permission associated with the user device. The at least one valid distributed ledger record may not be associated with a compromise of the user device.

The generating the third distributed ledger may comprise determining a hash. The determining the hash may be based on at least one other valid distributed ledger record on the first distributed ledger. The at least one other distributed ledger record may not comprise the inactive distributed ledger record. An indication of the hash and the at least one valid distributed ledger record may be caused to be stored on the user device. The network computing device 714 in FIG. 7 may cause an indication of the hash and the at least one valid distributed ledger record to be stored on the user device 700 in FIG. 7. The hash may be based at least on the one valid distributed ledger record entry.

The inactive distributed ledger record may comprise an expired distributed ledger record entry. A size of the third distributed ledger may be based on a size of a storage medium of the user device. An original distributed ledger comprising the at least one valid distributed ledger record and the inactive distributed ledger record may be generated based on the third distributed ledger and the second distributed ledger. The network computing device 714 in FIG. 7 may generate an original distributed ledger comprising the at least one valid distributed ledger record and the inactive distributed ledger record based on the third distributed ledger and the second distributed ledger. The generating the third distributed ledger may comprise determining a hash based on a plurality of distributed ledger records on the first distributed ledger. The plurality of distributed ledger records may not comprise the inactive distributed ledger record. The third distributed ledger may comprise the hash.

At step 1440, the third distributed ledger may be caused to be stored on the user device. The network computing device 714 in FIG. 7 may cause the third distributed ledger to be stored on the user device 700 in FIG. 7. The causing the third distributed ledger to be stored on the user device may comprise causing the first distributed ledger to be removed from the user device.

A Wi-Fi router may comprise a first distributed ledger to determine if a device requesting access has permissions required for the requested access. The first distributed ledger may comprise a block comprising a valid transaction related to a laptop. The first distributed ledger may comprise a block comprising an expired transaction related to a tablet. A miner in a network computing environment may add the block comprising the expired transaction related to the tablet to a second distributed ledger stored in a network storage device. The miner may generate a third distributed ledger. The third distributed ledger may be similar to the first distributed ledger, except that the third distributed ledger may not comprise the block comprising the expired transaction related to the tablet. The third distributed ledger may comprise the block comprising the valid transaction related to the laptop. The miner may transmit the third distributed ledger to the Wi-Fi router. The Wi-Fi router may replace the first distributed ledger with the third distributed ledger.

FIG. 15 shows an example method of managing a distributed ledger. At step 1510, an indication of a distributed ledger record entry associated with a user device may be received by a computing device. The network computing device 714 in FIG. 7 may receive an indication of a distributed ledger record entry associated with the user device 700 in FIG. 7. The computing device may comprise a network computing device.

At step 1520, a distributed ledger record may be determined. The distributed ledger record may be determined based on the receiving the indication of the distributed ledger record entry. The network computing device 714 in FIG. 7 may determine a distributed ledger record based on the receiving the indication of the distributed ledger record entry. The distributed ledger record may be on a first distributed ledger stored on the user device. The distributed ledger record may be on a first distributed ledger stored on the user device 700 in FIG. 7.

At step 1530, the distributed ledger record may be caused to be added to a second distributed ledger. The network computing device 714 in FIG. 7 may cause the distributed ledger record to be added to a second distributed ledger. The computing device may be configured to cause the distributed ledger record to be added to the second distributed ledger by sending an indication of the distributed ledger record to a network storage device. The computing device may be configured to cause the distributed ledger record to be added to the second distributed ledger by generating the second distributed ledger and sending an indication of the second distributed ledger to a network storage device.

At step 1540, a third distributed ledger may be generated. The network computing device 714 in FIG. 7 may generate a third distributed ledger. The third distributed ledger may comprise the new distributed ledger record entry and may not comprise the distributed ledger record.

A distributed ledger may be stored on a local memory of a lighting control device. A gateway device may determine that a record stored on the distributed ledger comprises an indication of an account that is inactive. The gateway device may determine that a record stored on the distributed ledger comprises an indication of an account that is inactive based on the local memory of a lighting control device reaching 90% capacity. The gateway device may send an indication of the record to a network computing device. The network computing device may add the record to a secondary distributed ledger associated with the lighting control device. The gateway device may generate an updated version of the distributed ledger. The updated version of the distributed ledger may not comprise the record. The updated version of the distributed ledger may comprise a different record. The updated version of the distributed ledger may not comprise one or more records that are stored on the distributed ledger. The gateway device may send the updated version of the distributed ledger to the lighting control device. The lighting control device may store the updated version of the distributed ledger to its local memory.

Figure 16:
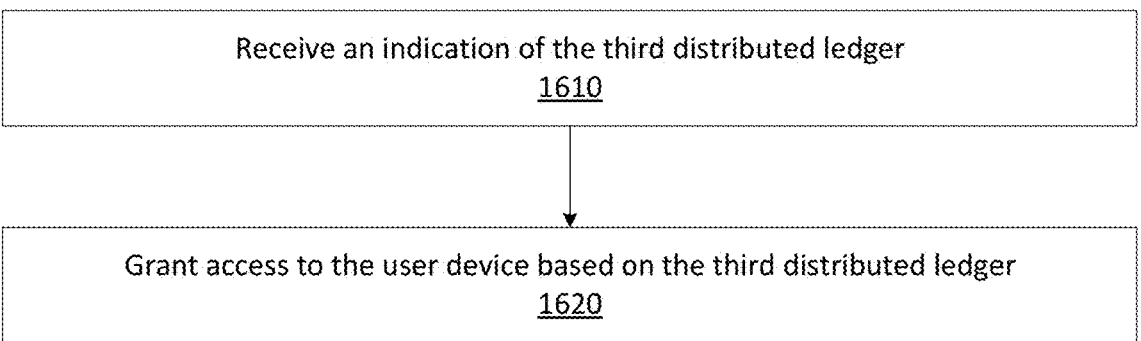
FIG. 16 shows an example method.

FIG. 16 shows an example method of managing a distributed ledger. At step 1610, an indication of the third distributed ledger may be received. The user device 700 in FIG. 7 may receive an indication of the third distributed ledger.

At step 1620, access may be granted to the user device. Access may be granted to the user device based on the third distributed ledger. The user device 700 in FIG. 7 may grant access to the user device 700 based on the third distributed ledger. The user device may be configured to grant access to the user device based on receiving a request to access the user device. The receiving the request to access the user device may comprise receiving the request from another user device. The user device may be configured to grant access to the user device by granting the other user device access to the user device. The user device may be configured to grant access to the user device by at least one of granting access to data stored on the user device, enabling another device to control the user device, enabling a user to control the user device, or enabling use of a function of the user device.

A miner in a network computing environment may receive a transaction from a Wi-Fi router. The transaction may indicate that a laptop is allowed to access the Wi-Fi router. The Wi-Fi router may comprise a first distributed ledger to determine if a device requesting access has permissions required for the requested access. The first distributed ledger may comprise a block comprising an expired transaction related to a tablet. The miner may add the block comprising the expired transaction related to the tablet to a second distributed ledger stored in a network storage device. The miner may generate a third distributed ledger. The third distributed ledger may be similar to the first distributed ledger, except that the third distributed ledger may not comprise the block comprising the expired transaction related to the tablet and the third distributed ledger may comprise a block comprising the transaction indicating that the laptop is allowed to access the Wi-Fi router. The miner may transmit the third distributed ledger to the Wi-Fi router. The Wi-Fi router may replace the first distributed ledger with the third distributed ledger.

For example, a camera device may receive a request from a tablet device to receive video from the camera device. The camera device may determine that a primary distributed ledger stored on the camera device comprises a record indicating that the tablet device has been granted permission to receive video from the tablet device. Based on the record, the tablet device may send video to the tablet device.

Figure 17:
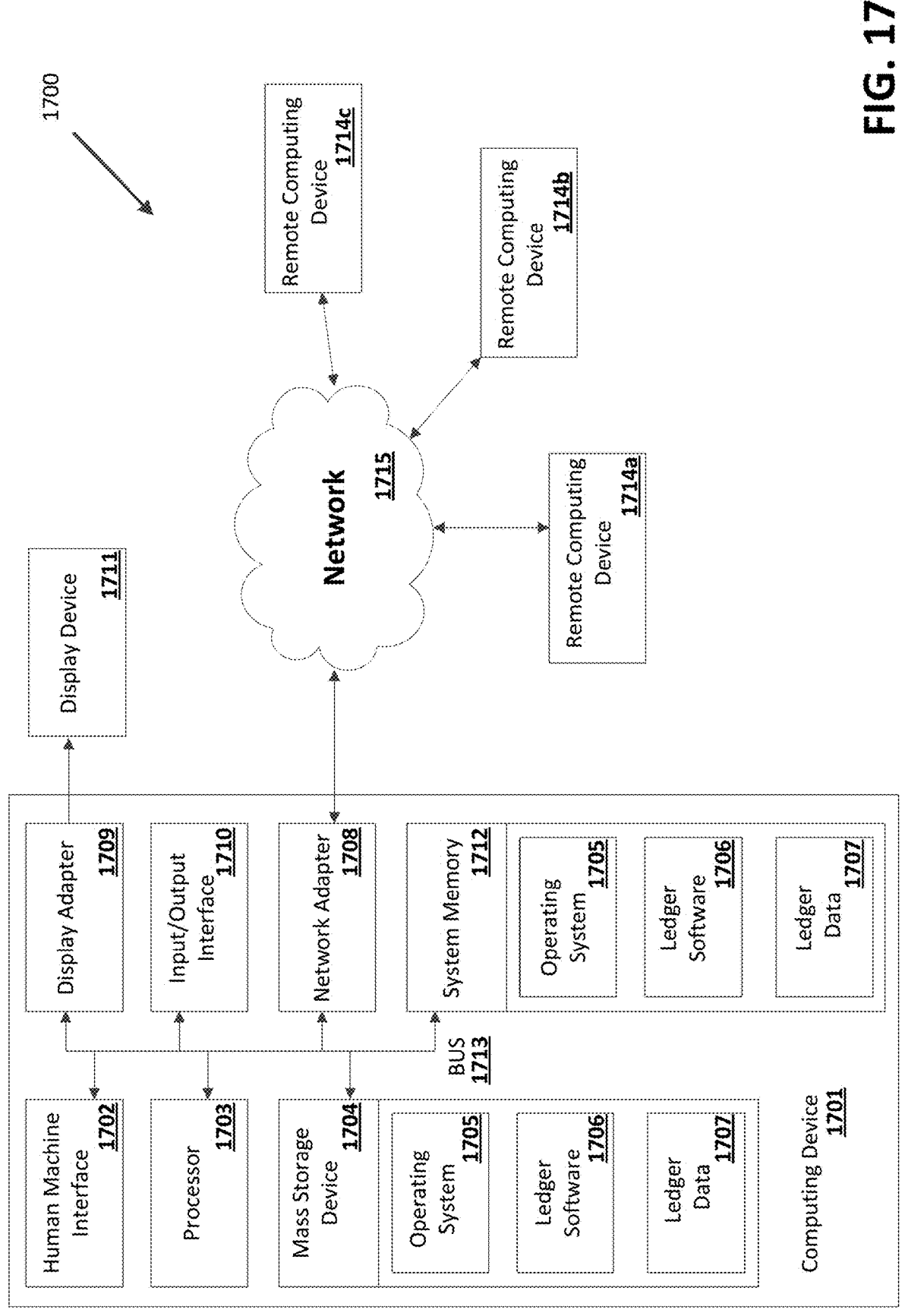
FIG. 17 shows an example computing environment.

FIG. 17 shows a block diagram showing an exemplary operating environment 1700 for performing the disclosed methods of managing digital rights and/or distributed ledgers. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The systems, methods, and apparatuses described herein may be implemented on a computing device such as a computing device 1701 (e.g., computer) as shown in FIG. 17 and described below. The one or more nodes 110 in FIG. 1 may be and/or comprise a computing device as shown in FIG. 17. The user device 700, the network computing device 714, and/or the network storage device 712 in FIG. 7 may be and/or comprise one or more computing devices and/or one or more portions of a computing device as shown in FIG. 17. Similarly, the methods, systems, and apparatuses disclosed may utilize one or more computing device to perform one or more functions in one or more locations. FIG. 17 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 1701. The components of the computing device 1701 may comprise, but are not limited to, one or more processors 1703, a system memory 1712, and a system bus 1713 that couples various system components including the processor 1703 to the system memory 1712. With multiple processors 1703, the system may utilize parallel computing.

The system bus 1713 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1713, and all buses specified in this description may be implemented over a wired or wireless network connection and each of the subsystems, including the processor 1703, a mass storage device 1704, an operating system 1705, ledger software 1706, ledger data 1707, a network adapter 1708, system memory 1712, an Input/Output Interface 1710, a display adapter 1709, a display device 1711, and a human machine interface 1702, may be contained within one or more remote computing devices 1714*a,b,c* at physically separate locations, connected through buses of this form, in effect implementing a fully distributed system. The ledger software 1706 may comprise distributed ledger management software. The ledger data 1707 may comprise distributed ledger management data.

The computing device 1701 typically comprises a variety of computer readable media. Readable media may be any available media that is accessible by the computing device 1701 and comprises both volatile and non-volatile media, removable and non-removable media. The system memory 1712 comprises computer readable media in the form of volatile memory, such as random access memory (RAM), and/or non-volatile memory, such as read only memory (ROM). The system memory 1712 typically contains data such as ledger data 1707 and/or program modules such as operating system 1705 and ledger software 1706 that are immediately accessible to and/or are presently operated on by the processor 1703.

The computing device 1701 may comprise other removable/non-removable, volatile/non-volatile computer storage media. FIG. 17 shows a mass storage device 1704 which may provide non-volatile storage of computer code, computer readable instructions, data structures, program modules, and other data for the computing device 1701. A mass storage device 1704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1704, including an operating system 1705 and ledger software 1706. Each of the operating system 1705 and ledger software 1706 (or some combination thereof) may comprise elements of the programming and the ledger software 1706. Ledger data 1707 may be stored on the mass storage device 1704. Ledger data 1707 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 1701 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 1703 via a human machine interface 1702 that is coupled to the system bus 1713, but may be connected by other interface and bus structures, such as a parallel port, game port, an IEEE 1394 Port (also known as a Firewire port), a serial port, or a universal serial bus (USB).

A display device 1711 may be connected to the system bus 1713 via an interface, such as a display adapter 1709. It is contemplated that the computing device 1701 may have more than one display adapter 1709 and the computing device 1701 may have more than one display device 1711. A display device may be a monitor, an LCD (Liquid Crystal Display), or a projector. Output peripheral devices may comprise components such as speakers (not shown) and a printer (not shown) which may be connected to the computing device 1701 via Input/Output Interface 1710. Any step and/or result of the methods may be output in any form to an output device. Such output may be any form of visual representation, including, but not limited to, textual, graphical, animation, audio, tactile, and the like. The display 1711 and computing device 1701 may be part of one device, or separate devices.

The computing device 1701 may operate in a networked environment using logical connections to one or more remote computing devices 1714*a,b,c*. A remote computing device may be a personal computer, portable computer, smartphone, a server, a router, a network computer, a peer device or other common network node, and so on. Logical connections between the computing device 1701 and a remote computing device 1714*a,b,c* may be made via a network 1715, such as a local area network (LAN) and a general wide area network (WAN). Such network connections may be through a network adapter 1708. A network adapter 1708 may be implemented in both wired and wireless environments. Such networking environments are conventional and commonplace in dwellings, offices, enterprise-wide computer networks, intranets, and the Internet.

Application programs and other executable program components such as the operating system 1705 are shown herein as discrete blocks, although it is recognized that such programs and components reside at various times in different storage components of the computing device 1701, and are executed by the data processor(s) of the computer. An implementation of ledger software 1706 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
    determining, by a computing device, a first distributed ledger record on a primary distributed ledger, wherein the first distributed ledger record comprises an active permission associated with a user device, and wherein the first distributed ledger record comprises an identifier that indicates a position of the first distributed ledger record on the primary distributed ledger;

receiving, by the computing device and from the user device, a second distributed ledger record comprising an updated active permission associated with the user device;

causing removal, from the primary distributed ledger and based on receiving the second distributed ledger record, of the first distributed ledger record; and storing, on a secondary distributed ledger located on a storage device, the first distributed ledger record as an inactive record, wherein the identifier that indicates the position of the first distributed ledger record on the primary distributed ledger is preserved in the inactive record on the secondary distributed ledger.

2. The method of claim 1, wherein the primary distributed ledger is stored on one or more of the computing device or the user device.

3. The method of claim 1, wherein the determining the first distributed ledger record on the primary distributed ledger comprises at least one of storing the first distributed ledger record on the primary distributed ledger, accessing the first distributed ledger record on the primary distributed ledger, or receiving an indication of the first distributed ledger record.

4. The method of claim 1, wherein the storage device comprises at least one of the computing device, a database associated with the computing device, a server associated with the computing device, a network computing device, or a cloud storage device.

5. The method of claim 1, further comprising storing the second distributed ledger record on the primary distributed ledger.

6. The method of claim 1, wherein the user device comprises at least one of a lighting device, a sensor device, an alarm device, a temperature control device, a lighting control device, a lock device, a communication device, a camera device, or a home appliance device.

7. The method of claim 1, wherein the inactive record comprises at least one of an expired permission, a revoked permission, or a permission associated with a security compromise.

8. A device comprising:

one or more processors; and memory storing instructions that, when executed by the one or more processors, cause the device to:

determine a first distributed ledger record on a primary distributed ledger, wherein the first distributed ledger record comprises an active permission associated with a user device, and wherein the first distributed ledger record comprises an identifier that indicates a position of the first distributed ledger record on the primary distributed ledger;

receive, from the user device, a second distributed ledger record comprising an updated active permission associated with the user device;

cause removal, from the primary distributed ledger and based on receiving the second distributed ledger record, of the first distributed ledger record; and store, on a secondary distributed ledger located on a storage device, the first distributed ledger record as an inactive record, wherein the identifier that indicates the position of the first distributed ledger record on the primary distributed ledger is preserved in the inactive record on the secondary distributed ledger.

9. The device of claim 8, wherein the primary distributed ledger is stored on one or more of the device or the user device.

10. The device of claim 8, wherein causing the device to determine the first distributed ledger record on the primary distributed ledger comprises at least one of causing the device to store the first distributed ledger record on the primary distributed ledger, access the first distributed ledger record on the primary distributed ledger, or receive an indication of the first distributed ledger record.

11. The device of claim 8, wherein the storage device comprises at least one of the device, a database associated with the device, a server associated with the device, a network computing device, or a cloud storage device.

12. The device of claim 8, further comprising storing the second distributed ledger record on the primary distributed ledger.

13. The device of claim 8, wherein the user device comprises at least one of a lighting device, a sensor device, an alarm device, a temperature control device, a lighting control device, a lock device, a communication device, a camera device, or a home appliance device.

14. The device of claim 8, wherein the inactive record comprises at least one of an expired permission, a revoked permission, or a permission associated with a security compromise.

15. A system comprising:

a user device;

a storage device; and a computing device configured to:

determine a first distributed ledger record on a primary distributed ledger, wherein the first distributed ledger record comprises an active permission associated with the user device, and wherein the first distributed ledger record comprises an identifier that indicates a position of the first distributed ledger record on the primary distributed ledger;

receive, from the user device, a second distributed ledger record comprising an updated active permission associated with the user device;

cause removal, from the primary distributed ledger and based on receiving the second distributed ledger record, of the first distributed ledger record; and store, on a secondary distributed ledger located on the storage device, the first distributed ledger record as an inactive record, wherein the identifier that indicates the position of the first distributed ledger record on the primary distributed ledger is preserved in the inactive record on the secondary distributed ledger.

16. The system of claim 15, wherein the primary distributed ledger is stored on one or more of the computing device or the user device.

17. The system of claim 15, wherein the computing device is configured to determine the first distributed ledger record on the primary distributed ledger, and wherein the computing device is further configured to at least one of cause the device to store the first distributed ledger record on the primary distributed ledger, access the first distributed ledger record on the primary distributed ledger, or receive an indication of the first distributed ledger record.

18. The system of claim 15, wherein the storage device comprises at least one of the computing device, a database associated with the computing device, a server associated with the computing device, a network computing device, or a cloud storage device.

19. The system of claim 15, further comprising storing the second distributed ledger record on the primary distributed ledger.

20. The system of claim 15, wherein the user device comprises at least one of a lighting device, a sensor device, an alarm device, a temperature control device, a lighting control device, a lock device, a communication device, a camera device, or a home appliance device.

21. The system of claim 15, wherein the inactive record comprises at least one of an expired permission, a revoked permission, or a permission associated with a security compromise.

22. A non-transitory computer-readable medium comprising instructions that, when executed, cause:

determining, by a computing device, a first distributed ledger record on a primary distributed ledger, wherein the first distributed ledger record comprises an active permission associated with a user device, and wherein the first distributed ledger record comprises an identifier that indicates a position of the first distributed ledger record on the primary distributed ledger;

receiving, by the computing device and from the user device, a second distributed ledger record comprising an updated active permission associated with the user device;

causing removal, from the primary distributed ledger and based on receiving the second distributed ledger record, of the first distributed ledger record; and storing, on a secondary distributed ledger located on a storage device, the first distributed ledger record as an inactive record, wherein the identifier that indicates the position of the first distributed ledger record on the primary distributed ledger is preserved in the inactive record on the secondary distributed ledger.

23. The non-transitory computer-readable medium of claim 22, wherein the primary distributed ledger is stored on one or more of the computing device or the user device.

24. The non-transitory computer-readable medium of claim 22, wherein the instructions, when executed cause the determining the first distributed ledger record on the primary distributed ledger, further comprising at least one of storing the first distributed ledger record on the primary distributed ledger, accessing the first distributed ledger record on the primary distributed ledger, or receiving an indication of the first distributed ledger record.

25. The non-transitory computer-readable medium of claim 22, wherein the storage device comprises at least one of the computing device, a database associated with the computing device, a server associated with the computing device, a network computing device, or a cloud storage device.

26. The non-transitory computer-readable medium of claim 22, wherein the instructions, when executed, further cause storing the second distributed ledger record on the primary distributed ledger.

27. The non-transitory computer-readable medium of claim 22, wherein the user device comprises at least one of a lighting device, a sensor device, an alarm device, a temperature control device, a lighting control device, a lock device, a communication device, a camera device, or a home appliance device.

28. The non-transitory computer-readable medium of claim 22, wherein the inactive record comprises at least one of an expired permission, a revoked permission, or a permission associated with a security compromise.

* * * * *